US012615675B2

(12) United States Patent
Kumar et al.

(10) Patent No.: US 12,615,675 B2
(45) Date of Patent: Apr. 28, 2026

(54) INFORMATION SHARING BETWEEN SIDELINK DEVICES

(71) Applicant: QUALCOMM Incorporated, San Diego, CA (US)

(72) Inventors: Satish Kumar, Hyderabad (IN); Sarath Pinayour Chandrasekaran, Hyderabad (IN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 17/684,161

(22) Filed: Mar. 1, 2022

(65) Prior Publication Data

US 2023/0284298 A1     Sep. 7, 2023

(51) Int. Cl.
| | |
|---|---|
| *H04W 76/14* | (2018.01) |
| *H04W 4/12* | (2009.01) |
| *H04W 92/18* | (2009.01) |
| *H04W 92/20* | (2009.01) |

(52) U.S. Cl.
CPC ............. *H04W 76/14* (2018.02); *H04W 4/12* (2013.01); *H04W 92/18* (2013.01); *H04W 92/20* (2013.01)

(58) Field of Classification Search
CPC ....... H04W 76/14; H04W 4/12; H04W 92/18; H04W 92/20
See application file for complete search history.

(56) References Cited

U.S. PATENT DOCUMENTS

| | | | | |
|---|---|---|---|---|
| 2021/0337514 | A1* | 10/2021 | Xiang ................... | H04W 72/02 |
| 2021/0385822 | A1* | 12/2021 | Chae ..................... | H04W 72/02 |
| 2021/0400732 | A1* | 12/2021 | Xue ........................... | H04L 5/14 |
| 2022/0015071 | A1* | 1/2022 | Hui ........................ | H04W 72/56 |
| 2022/0078778 | A1* | 3/2022 | Zhao .................... | H04L 1/1887 |
| 2022/0322359 | A1* | 10/2022 | Ye ........................... | H04W 72/02 |
| 2022/0338092 | A1* | 10/2022 | Wang .................... | H04W 92/18 |
| 2022/0369346 | A1* | 11/2022 | Xu ........................ | H04W 72/543 |
| 2023/0119446 | A1* | 4/2023 | Wang .................... | H04W 72/20 370/329 |
| 2023/0354386 | A1* | 11/2023 | Hui ........................ | H04W 72/20 |
| 2023/0362739 | A1* | 11/2023 | Zhao .................... | H04W 72/25 |
| 2023/0362773 | A1* | 11/2023 | Back .................... | H04W 28/02 |
| 2024/0023143 | A1* | 1/2024 | Wang .................... | G01S 5/0236 |
| 2024/0121659 | A1* | 4/2024 | Chen .................... | H04W 24/02 |
| 2024/0276528 | A1* | 8/2024 | Liu ........................ | H04L 1/1812 |

FOREIGN PATENT DOCUMENTS

| | | |
|---|---|---|
| WO | WO-2020165278 A1 | 8/2020 |
| WO | WO-2022040095 A1 | 2/2022 |

OTHER PUBLICATIONS

International Search Report and Written Opinion—PCT/US2023/060335—ISA/EPO—May 8, 2023 (2107179WO).

* cited by examiner

*Primary Examiner* — Syed Ali
(74) *Attorney, Agent, or Firm* — Holland & Hart LLP

(57) ABSTRACT

Methods, systems, and devices for wireless communications are described. A first network entity may establish a sidelink connection with a first user equipment (UE). The first network entity may detect sidelink communications including sidelink data from the first UE, and may forward the detected sidelink data to a second network entity via a sidelink interface or a backhaul link. The second network entity may transmit the sidelink data to a second UE via a sidelink connection between the second network entity and the second UE.

26 Claims, 13 Drawing Sheets

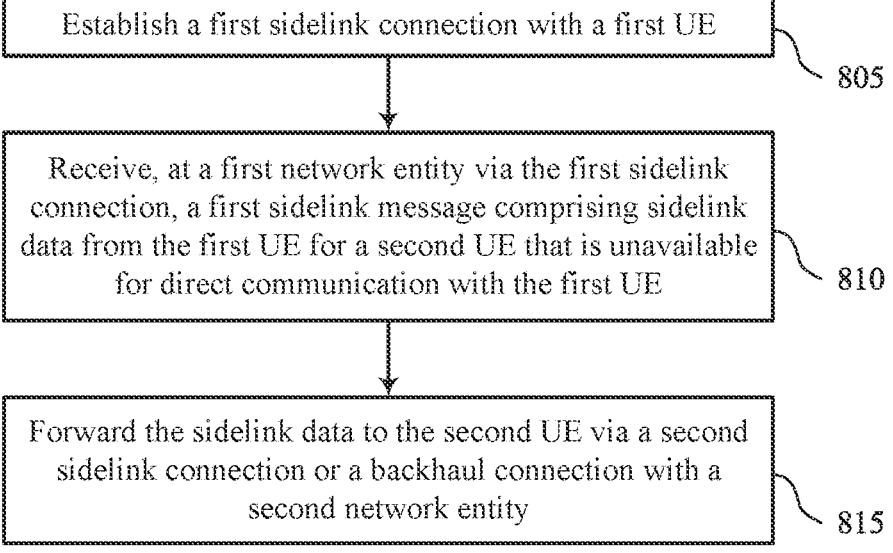

Establish a first sidelink connection with a first UE

805

Receive, at a first network entity via the first sidelink connection, a first sidelink message comprising sidelink data from the first UE for a second UE that is unavailable for direct communication with the first UE

810

Forward the sidelink data to the second UE via a second sidelink connection or a backhaul connection with a second network entity

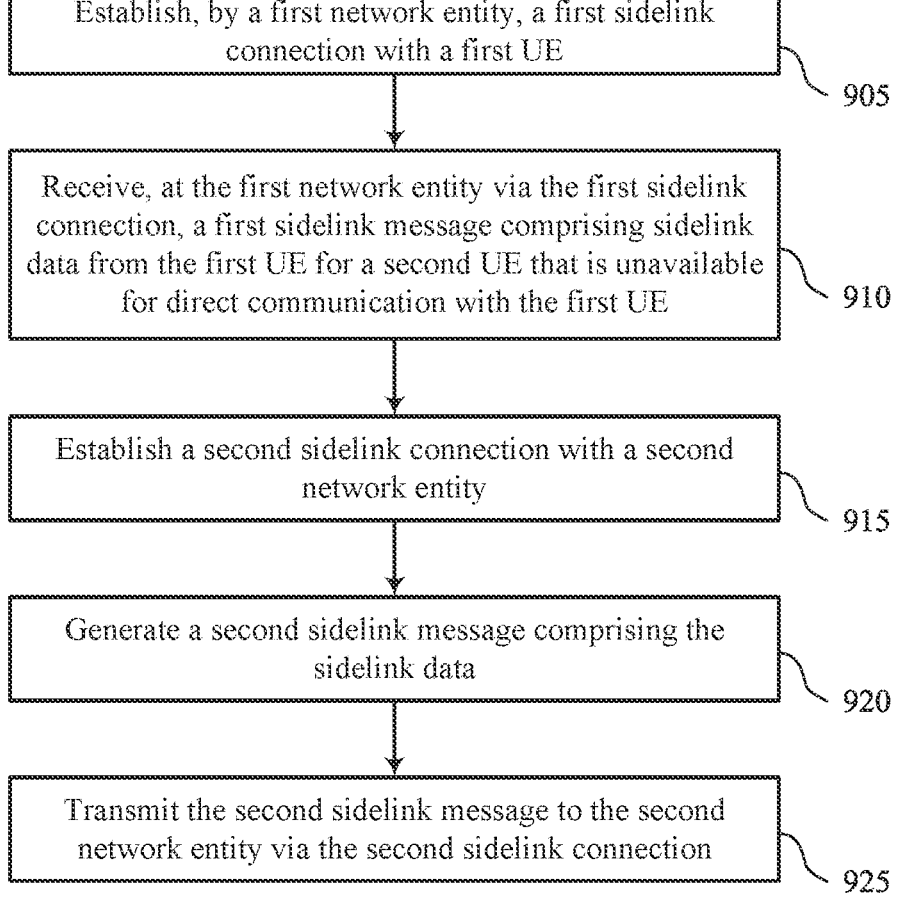

Establish, by a first network entity, a first sidelink connection with a first UE — 905

Receive, at the first network entity via the first sidelink connection, a first sidelink message comprising sidelink data from the first UE for a second UE that is unavailable for direct communication with the first UE — 910

Establish a second sidelink connection with a second network entity — 915

Generate a second sidelink message comprising the sidelink data — 920

Transmit the second sidelink message to the second network entity via the second sidelink connection — 925

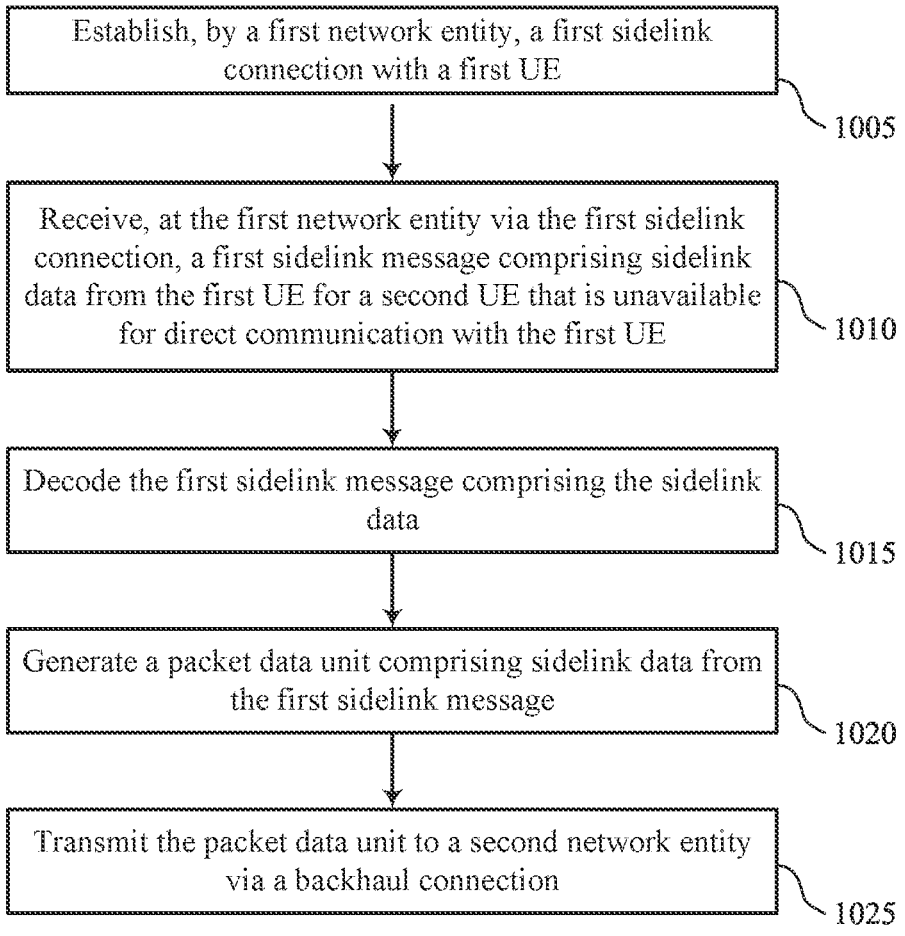

Establish, by a first network entity, a first sidelink connection with a first UE

1005

Receive, at the first network entity via the first sidelink connection, a first sidelink message comprising sidelink data from the first UE for a second UE that is unavailable for direct communication with the first UE

1010

Decode the first sidelink message comprising the sidelink data

1015

Generate a packet data unit comprising sidelink data from the first sidelink message

1020

Transmit the packet data unit to a second network entity via a backhaul connection

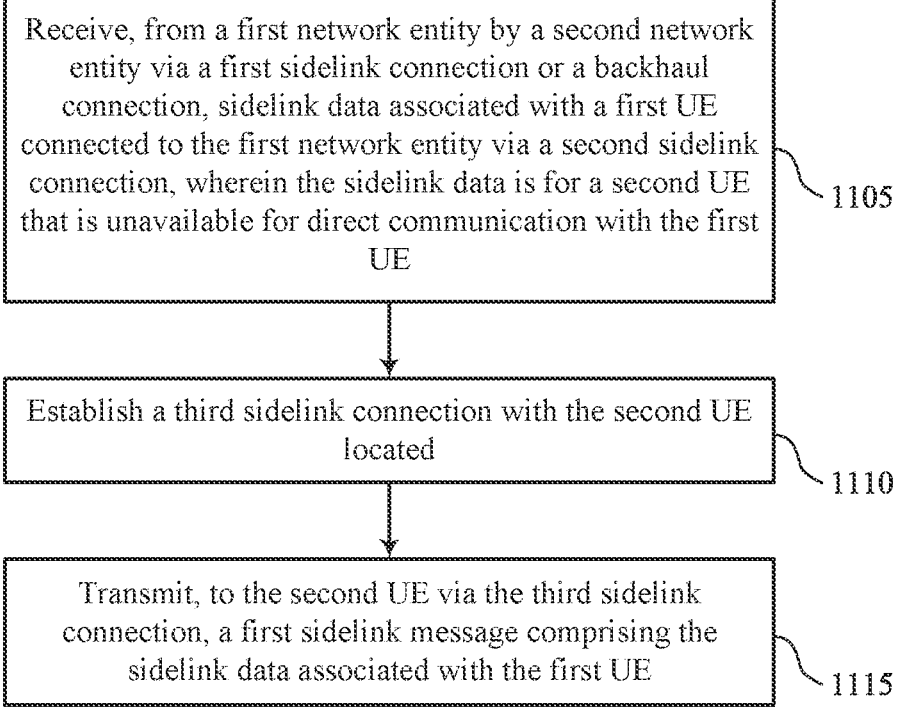

Receive, from a first network entity by a second network entity via a first sidelink connection or a backhaul connection, sidelink data associated with a first UE connected to the first network entity via a second sidelink connection, wherein the sidelink data is for a second UE that is unavailable for direct communication with the first UE

~ 1105

Establish a third sidelink connection with the second UE located

~ 1110

Transmit, to the second UE via the third sidelink connection, a first sidelink message comprising the sidelink data associated with the first UE

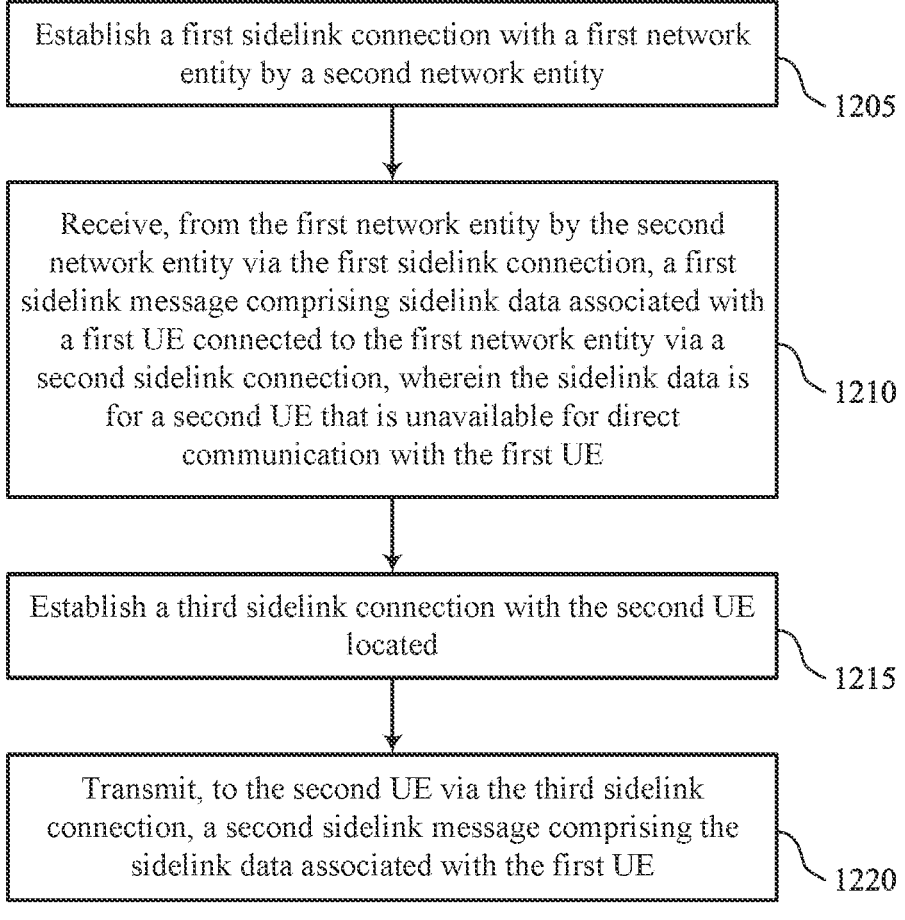

Establish a first sidelink connection with a first network entity by a second network entity ⟍ 1205

Receive, from the first network entity by the second network entity via the first sidelink connection, a first sidelink message comprising sidelink data associated with a first UE connected to the first network entity via a second sidelink connection, wherein the sidelink data is for a second UE that is unavailable for direct communication with the first UE ⟍ 1210

Establish a third sidelink connection with the second UE located ⟍ 1215

Transmit, to the second UE via the third sidelink connection, a second sidelink message comprising the sidelink data associated with the first UE ⟍ 1220

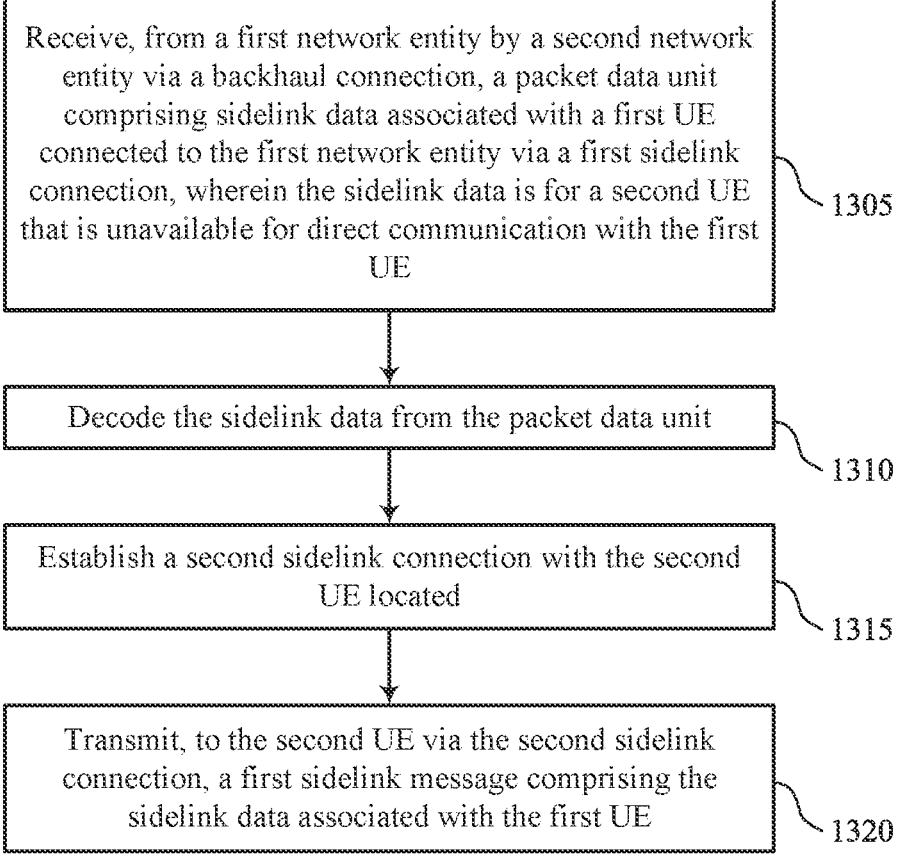

Receive, from a first network entity by a second network entity via a backhaul connection, a packet data unit comprising sidelink data associated with a first UE connected to the first network entity via a first sidelink connection, wherein the sidelink data is for a second UE that is unavailable for direct communication with the first UE

1305

Decode the sidelink data from the packet data unit

1310

Establish a second sidelink connection with the second UE located

1315

Transmit, to the second UE via the second sidelink connection, a first sidelink message comprising the sidelink data associated with the first UE

INFORMATION SHARING BETWEEN SIDELINK DEVICES

FIELD OF TECHNOLOGY

The following relates to wireless communications, including information sharing between sidelink devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support sidelink communications between UEs.

SUMMARY

The described techniques relate to improved methods, systems, devices, and apparatuses that support information sharing between sidelink devices. Generally, the described techniques provide for forwarding sidelink data between user equipments (UEs) that are not able to communicate directly with each other (e.g., two UEs may operate on different frequencies, according to different parameters, or may be shadowed or blocked by obstructions, or the like). Network entities (e.g., base stations, roadside units (RSUs), remote radio heads (RRHs) or other network entities) may support sidelink communications (e.g., may establish PC5 links) with various UEs. A first network entity may establish a sidelink connection with a first UE. The network entity may detect sidelink communications including sidelink data from the first UE (e.g., via a first band or channel, according to a first capability, or the like), and may forward the detected sidelink data to a second network entity. The first network entity may forward the sidelink data to the second network entity either via a PC5 interface or a backhaul link (e.g., an X2 interface, an Xn interface, or the like) between the two network entities. The second network entities may then transmit the sidelink data to the second UE via a sidelink connection between the second network entity and the second UE. Thus, the network entities may support sidelink communications between UEs that are not able to communicate directly with each other by utilizing sidelink connections with respective UEs.

A method for wireless communications at a first network entity is described. The method may include establishing a first sidelink connection with a first user equipment (UE), receiving, at the first network entity via the first sidelink connection, a first sidelink message including sidelink data from the first UE for a second UE that is unavailable for direct communication with the first UE, and forwarding the sidelink data to a second UE via a second sidelink connection or a backhaul connection with a second network entity.

An apparatus for wireless communications at a first network entity is described. The apparatus may include a processor, memory coupled with the processor, and instructions stored in the memory. The instructions may be executable by the processor to cause the apparatus to establish a first sidelink connection with a first UE, receive, at the first network entity via the first sidelink connection, a first sidelink message including sidelink data from the first UE for a second UE that is unavailable for direct communication with the first UE, and forward the sidelink data to a second UE via a second sidelink connection or a backhaul connection with a second network entity.

Another apparatus for wireless communications at a first network entity is described. The apparatus may include means for establishing a first sidelink connection with a first UE, means for receiving, at the first network entity via the first sidelink connection, a first sidelink message including sidelink data from the first UE for a second UE that is unavailable for direct communication with the first UE, and means for forwarding the sidelink data to a second UE via a second sidelink connection or a backhaul connection with a second network entity.

A non-transitory computer-readable medium storing code for wireless communications at a first network entity is described. The code may include instructions executable by a processor to establish a first sidelink connection with a first UE, receive, at the first network entity via the first sidelink connection, a first sidelink message including sidelink data from the first UE for a second UE that is unavailable for direct communication with the first UE, and forward the sidelink data to a second UE via a second sidelink connection or a backhaul connection with a second network entity.

In some examples of the method, apparatuses, and non-transitory computer-readable medium described herein, forwarding the sidelink data to the second UE may include operations, features, means, or instructions for establishing the second sidelink connection with the second network entity, generating a second sidelink message including the sidelink data, and transmitting the second sidelink message to the second network entity via the second sidelink connection.

Some examples of the method, apparatuses, and non-transitory computer-readable medium described herein may further include operations, features, means, or instructions for transmitting, to the second network entity, a frequency resource identifier associated with sidelink resources on which the first network entity received the sidelink data, location information associated with the first UE, or both.

Some examples of the method, apparatuses, and non-transitory computer-readable medium described herein may further include operations, features, means, or instructions for including the frequency resource identifier in a medium access control control element, a sidelink control information message, a sidelink radio resource control message, or any combination thereof.

In some examples of the method, apparatuses, and non-transitory computer-readable medium described herein, forwarding the sidelink data to the second UE may include operations, features, means, or instructions for decoding the first sidelink message including the sidelink data, generating a packet data unit including sidelink data from the first sidelink message, and transmitting the packet data unit to the second network entity via the backhaul connection.

In some examples of the method, apparatuses, and non-transitory computer-readable medium described herein, the packet data unit includes a source identifier associated with the first network entity, a destination identifier associated with the second network entity, an indication that the packet data unit includes the sidelink data, a frequency resource identifier associated with sidelink resources on which the first network entity received the sidelink data from the first UE, location information associated with the first UE, an identifier associated with the first UE, an indication that the packet data unit may be associated with the sidelink data from the first UE for the second UE, or any combination thereof.

In some examples of the method, apparatuses, and non-transitory computer-readable medium described herein, receiving the first sidelink message from the first UE for the second UE that may be unavailable for direct communication with the first UE may include operations, features, means, or instructions for receiving the first sidelink message on a first set of one or more frequency resources, where the first UE does not support sidelink communication on a second set of one or more frequency resources that may be different from the first set of one or more frequency resources.

In some examples of the method, apparatuses, and non-transitory computer-readable medium described herein, forwarding the sidelink data to the second UE that may be unavailable for direct communication with the first UE may include operations, features, means, or instructions for transmitting the sidelink data and an indication of the first set of one or more frequency resources to the second network entity for forwarding to the second UE on the second set of one or more frequency resources, where the second UE does not support sidelink communication on the first set of one or more frequency resources.

In some examples of the method, apparatuses, and non-transitory computer-readable medium described herein, receiving the first sidelink message from the first UE for the second UE that may be unavailable for direct communication with the first UE may include operations, features, means, or instructions for receiving the first sidelink message according to a first modulation and coding scheme that may be supported by the first UE but may be not supported by the second UE.

In some examples of the method, apparatuses, and non-transitory computer-readable medium described herein, forwarding the sidelink data to the second UE that may be unavailable for direct communication with the first UE may include operations, features, means, or instructions for transmitting the sidelink data to the second network entity for forwarding to the second UE according to a second modulation and coding scheme that may be supported by the second UE.

In some examples of the method, apparatuses, and non-transitory computer-readable medium described herein, the first network entity and the second network entity include base stations, remote radio heads, roadside units, or a combination thereof.

In some examples of the method, apparatuses, and non-transitory computer-readable medium described herein, the first network entity and the second network entity may be collocated and associated with a processing unit.

In some examples of the method, apparatuses, and non-transitory computer-readable medium described herein, the first UE and the second UE include vehicle-to-everything devices.

A method for wireless communications is described. The method may include receiving, from a first network entity by a second network entity via a first sidelink connection or a backhaul connection, sidelink data associated with a first UE connected to the first network entity via a second sidelink connection, where the sidelink data is for a second UE that is unavailable for direct communication with the first UE, establishing a third sidelink connection with the second UE, and transmitting, to the second UE via the third sidelink connection, a first sidelink message including the sidelink data associated with the first UE.

An apparatus for wireless communications is described. The apparatus may include a processor, memory coupled with the processor, and instructions stored in the memory. The instructions may be executable by the processor to cause the apparatus to receive, from a first network entity by a second network entity via a first sidelink connection or a backhaul connection, sidelink data associated with a first UE connected to the first network entity via a second sidelink connection, where the sidelink data is for a second UE that is unavailable for direct communication with the first UE, establish a third sidelink connection with the second UE, and transmit, to the second UE via the third sidelink connection, a first sidelink message including the sidelink data associated with the first UE.

Another apparatus for wireless communications is described. The apparatus may include means for receiving, from a first network entity by a second network entity via a first sidelink connection or a backhaul connection, sidelink data associated with a first UE connected to the first network entity via a second sidelink connection, where the sidelink data is for a second UE that is unavailable for direct communication with the first UE, means for establishing a third sidelink connection with the second UE, and means for transmitting, to the second UE via the third sidelink connection, a first sidelink message including the sidelink data associated with the first UE.

A non-transitory computer-readable medium storing code for wireless communications is described. The code may include instructions executable by a processor to receive, from a first network entity by a second network entity via a first sidelink connection or a backhaul connection, sidelink data associated with a first UE connected to the first network entity via a second sidelink connection, where the sidelink data is for a second UE that is unavailable for direct communication with the first UE, establish a third sidelink connection with the second UE, and transmit, to the second UE via the third sidelink connection, a first sidelink message including the sidelink data associated with the first UE.

In some examples of the method, apparatuses, and non-transitory computer-readable medium described herein, receiving the sidelink data may include operations, features, means, or instructions for establishing the first sidelink connection with the first network entity and receiving a second sidelink message including the sidelink data via the first sidelink connection.

Some examples of the method, apparatuses, and non-transitory computer-readable medium described herein may further include operations, features, means, or instructions for receiving, from the first network entity, a frequency resource identifier associated with sidelink resources on which the first network entity received the sidelink data, location information associated with the first UE, or both.

In some examples of the method, apparatuses, and non-transitory computer-readable medium described herein, the frequency resource identifier may be included in a medium access control control element, a sidelink control information message, or a sidelink radio resource control message, or a combination thereof.

In some examples of the method, apparatuses, and non-transitory computer-readable medium described herein, receiving the sidelink data may include operations, features, means, or instructions for receiving a packet data unit including the sidelink data from the first network entity via the backhaul connection and decoding the sidelink data from the packet data unit.

In some examples of the method, apparatuses, and non-transitory computer-readable medium described herein, the packet data unit includes a source identifier associated with the first network entity, a destination identifier associated with the second network entity, an indication that the packet data unit includes the sidelink data, a frequency resource identifier associated with sidelink resources on which the first network entity received the sidelink data from the first UE, location information associated with the first UE, an identifier associated with the first UE, an indication that the packet data unit may be associated with the sidelink data from the first UE for the second UE, or any combination thereof.

In some examples of the method, apparatuses, and non-transitory computer-readable medium described herein, transmitting the first sidelink message to the second UE that may be unavailable for direct communication with the first UE may include operations, features, means, or instructions for transmitting, on a first set of one or more frequency resources, the first sidelink message including an indication of a second set of one or more frequency resources that may be different from the first set of one or more frequency resources, where the second UE does not support sidelink communications on the second set of one or more frequency resources and the first UE does not support sidelink communication on the first set of one or more frequency resources.

In some examples of the method, apparatuses, and non-transitory computer-readable medium described herein, transmitting the first sidelink message to the second UE that may be unavailable for direct communication with the first UE may include operations, features, means, or instructions for transmitting the first sidelink message according to a first modulation and coding scheme that may be supported by the second UE but may be not supported by the first UE.

In some examples of the method, apparatuses, and non-transitory computer-readable medium described herein, the first network entity and the second network entity include base stations, remote radio heads, roadside units, or a combination thereof.

In some examples of the method, apparatuses, and non-transitory computer-readable medium described herein, the first network entity and the second network entity may be collocated and associated with a processing unit.

In some examples of the method, apparatuses, and non-transitory computer-readable medium described herein, the first UE and the second UE include vehicle-to-everything devices.

6

Figure 2:
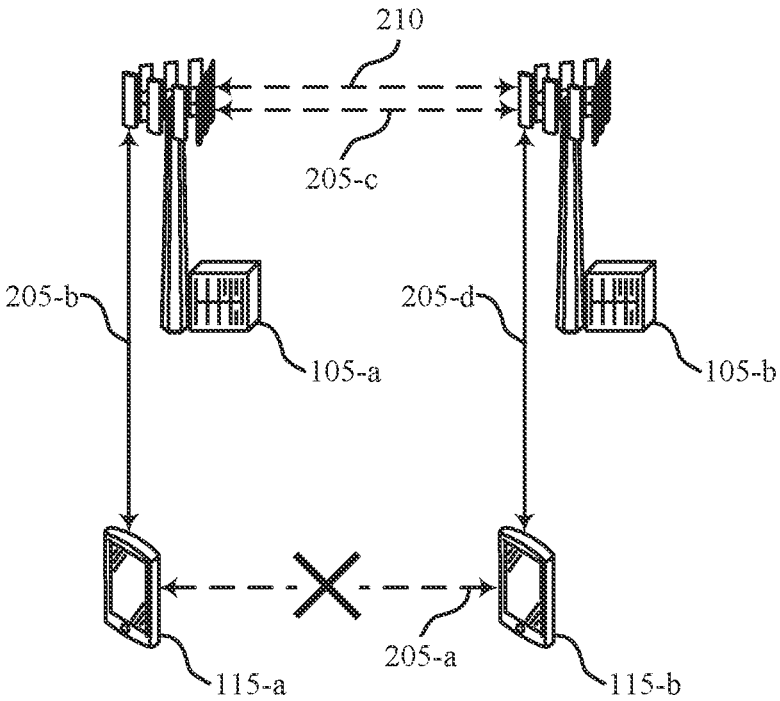

FIG. 2 illustrates an example of a wireless communication system that supports information sharing between sidelink devices in accordance with aspects of the present disclosure.

Figure 3:
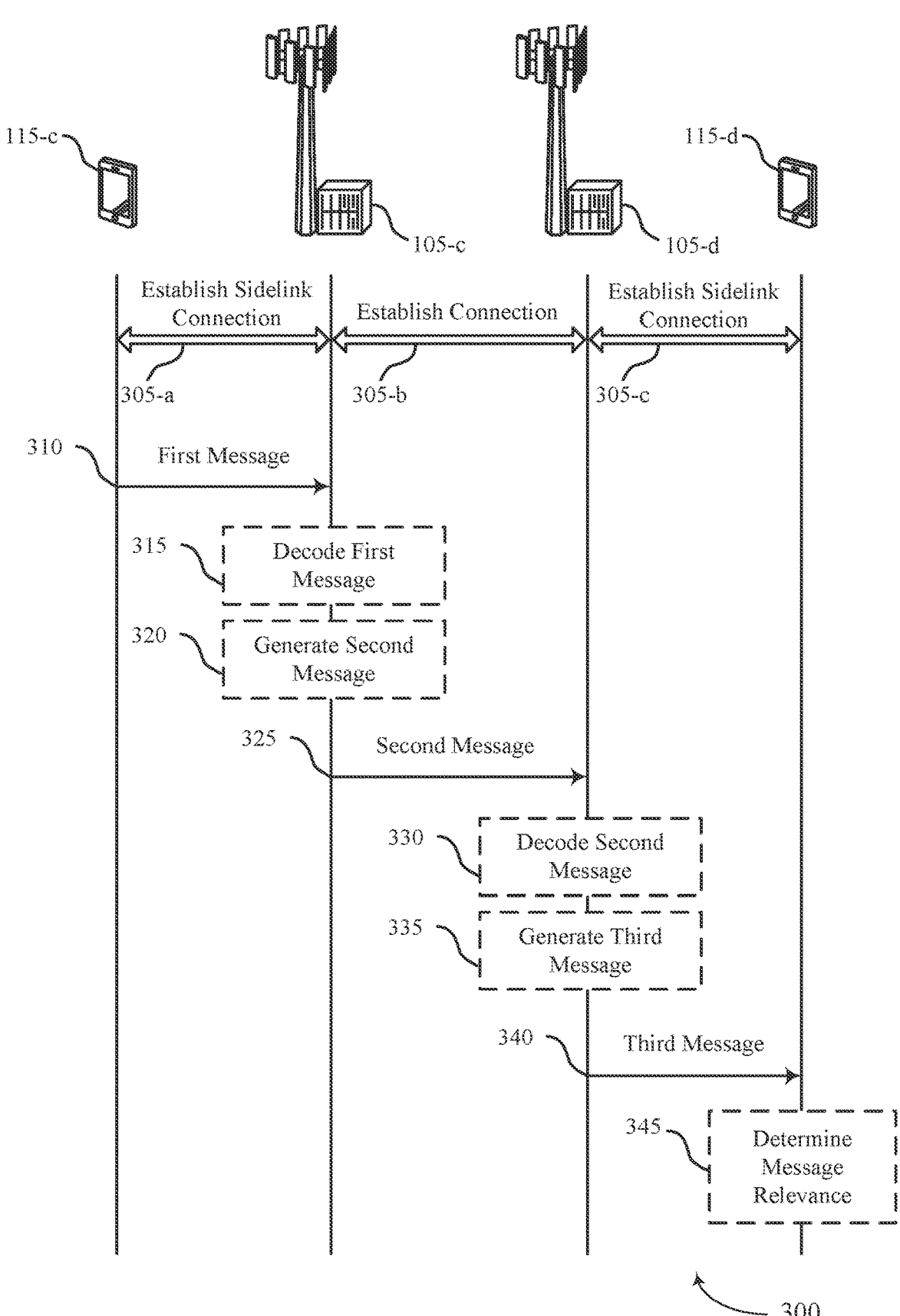

FIG. 3 illustrates an example of a process flow that supports information sharing between sidelink devices in accordance with aspects of the present disclosure.

Figure 4:
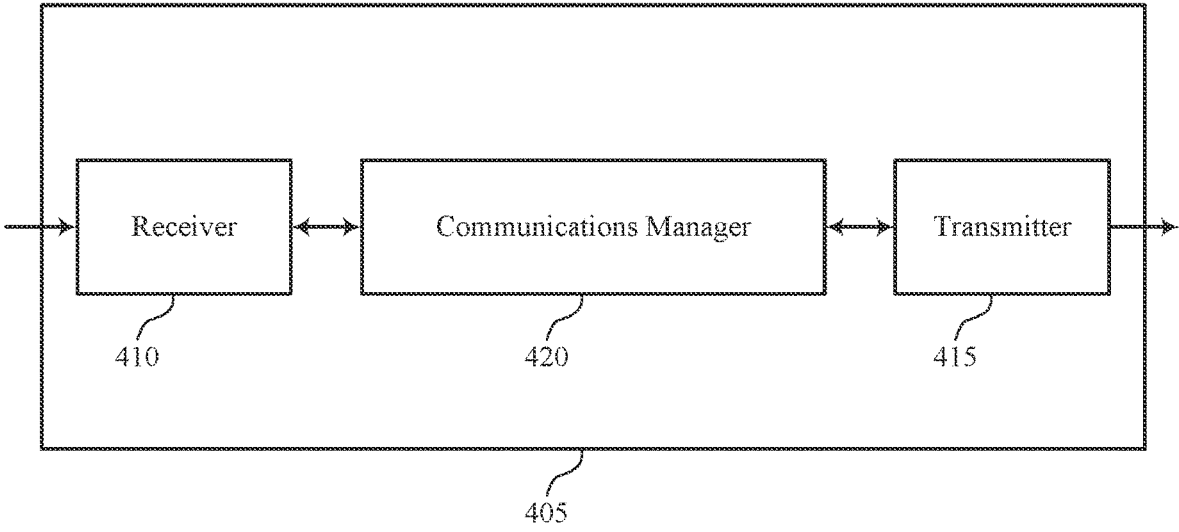
Figure 5:
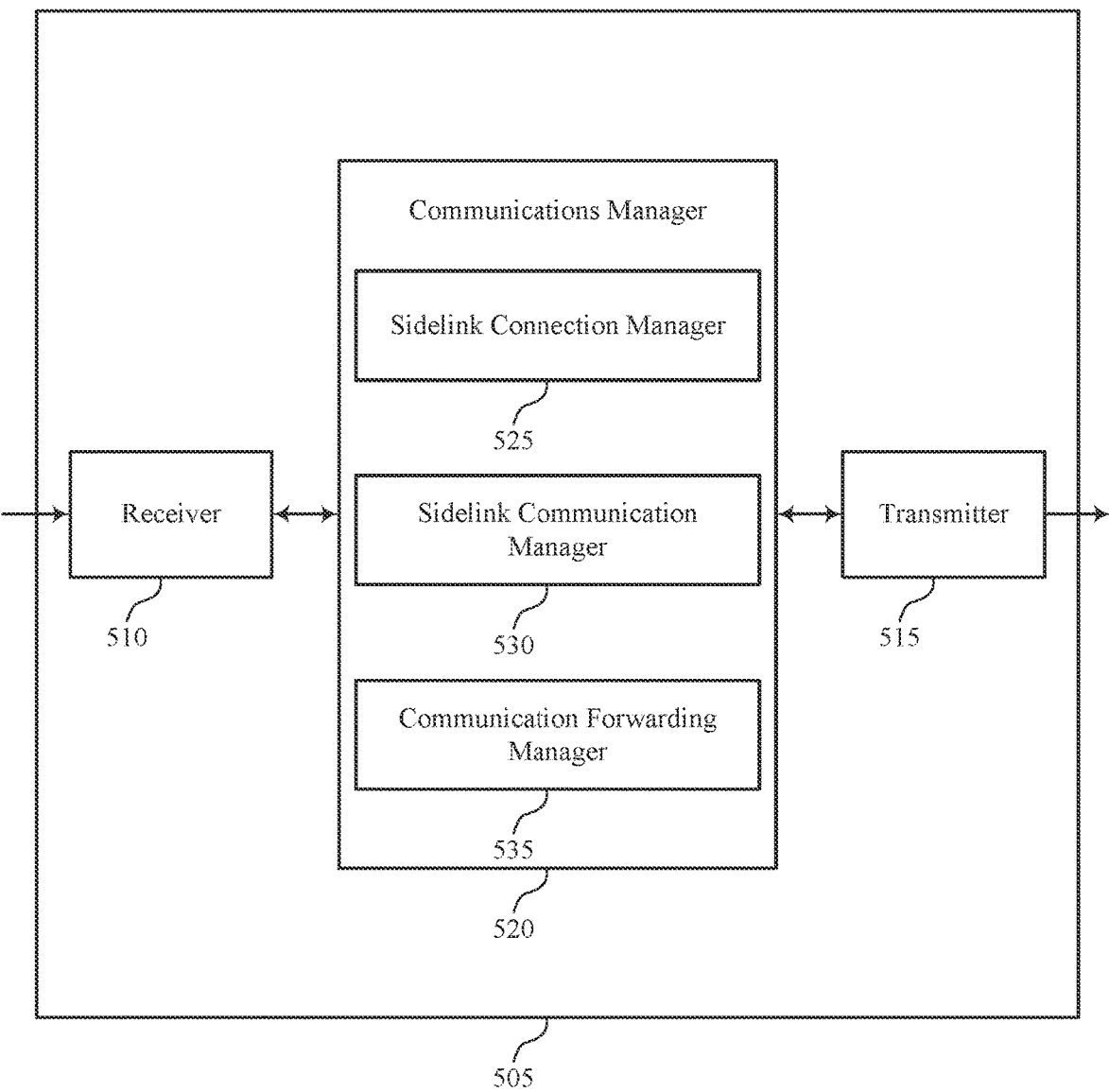

FIGS. 4 and 5 show block diagrams of devices that support information sharing between sidelink devices in accordance with aspects of the present disclosure.

Figure 6:
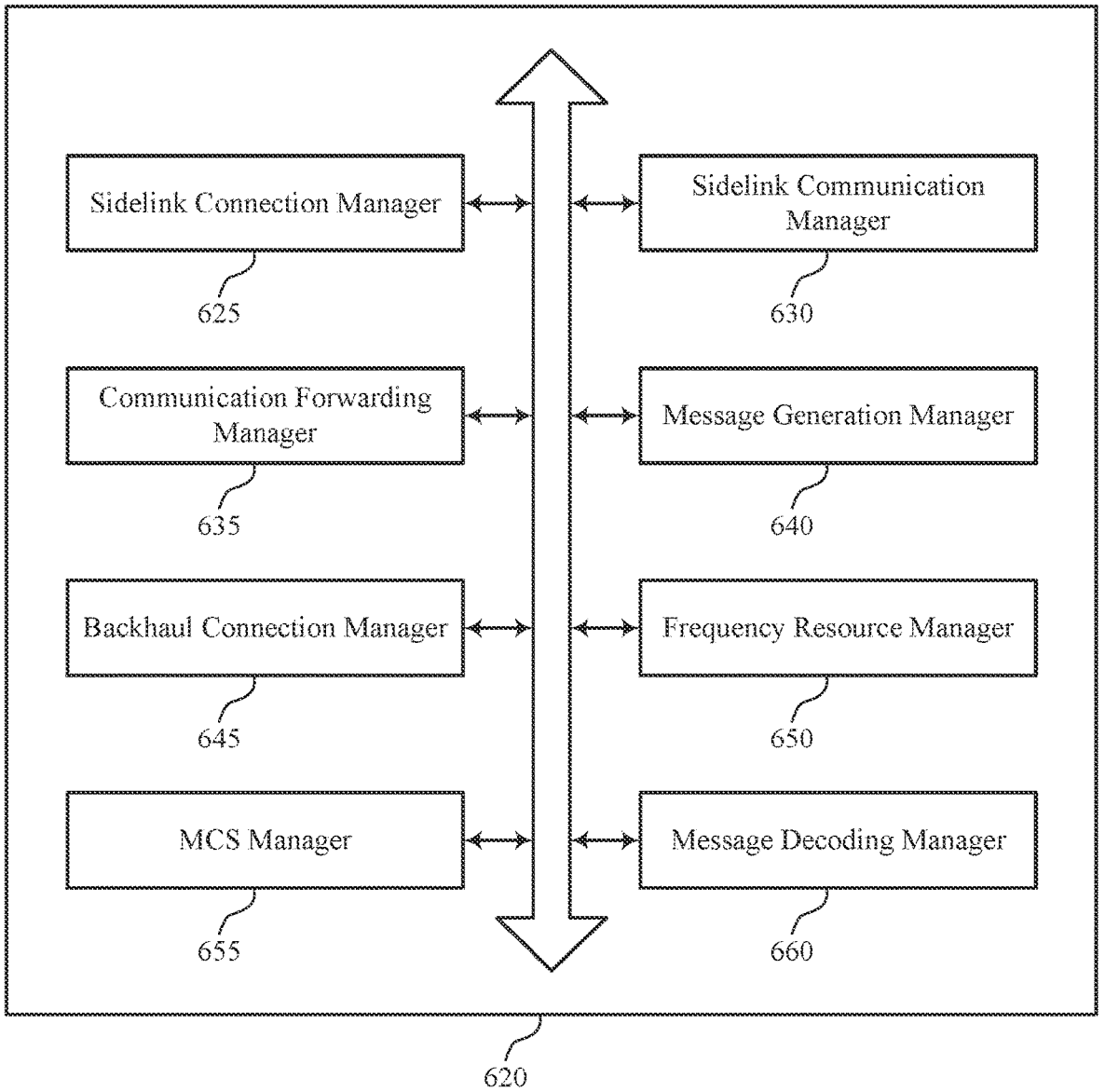

FIG. 6 shows a block diagram of a communications manager that supports information sharing between sidelink devices in accordance with aspects of the present disclosure.

Figure 7:
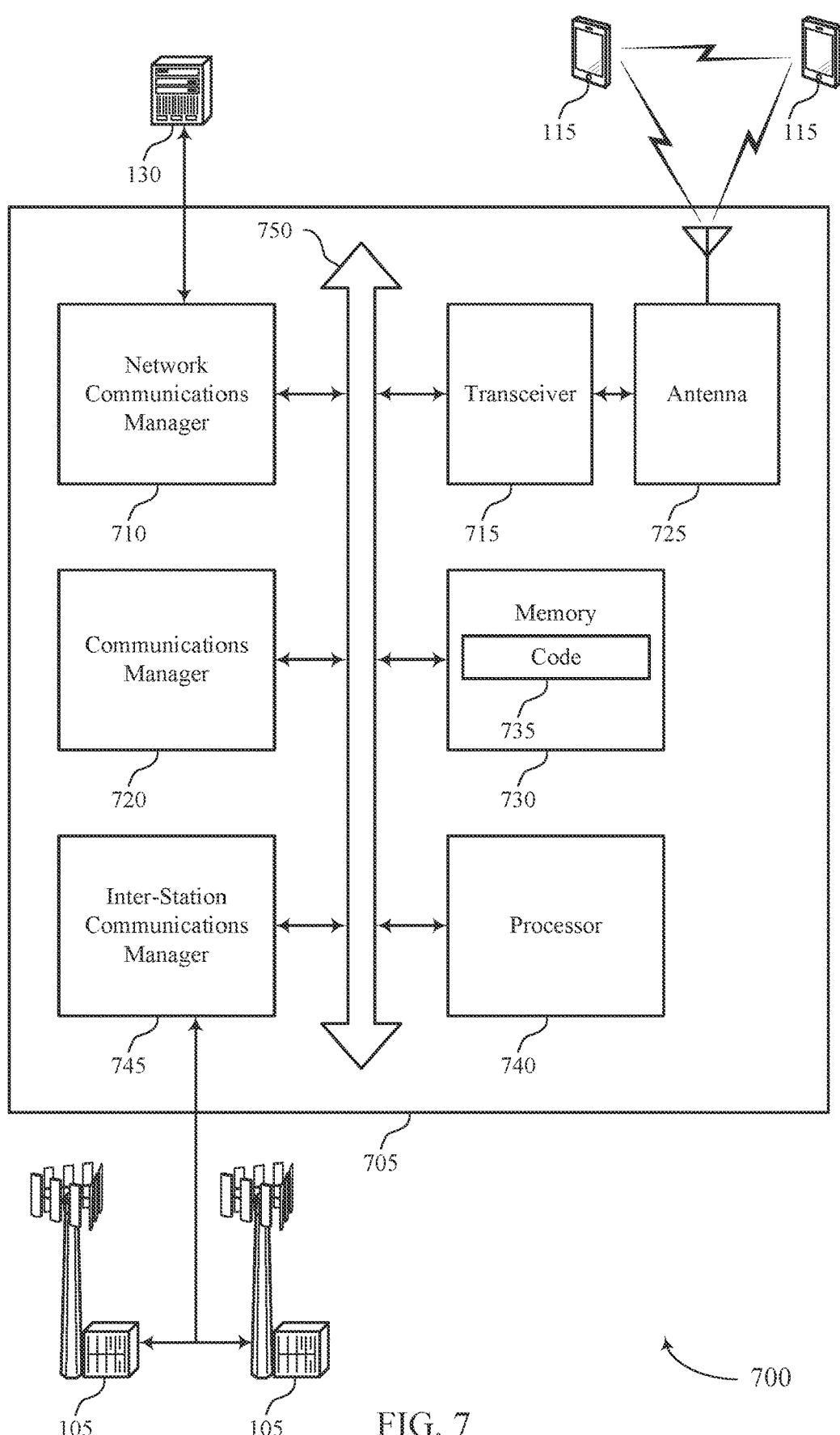

FIG. 7 shows a diagram of a system including a device that supports information sharing between sidelink devices in accordance with aspects of the present disclosure.

FIGS. 8 through 13 show flowcharts illustrating methods that support information sharing between sidelink devices in accordance with aspects of the present disclosure.

DETAILED DESCRIPTION

Wireless communications systems may support sidelink communications, such as vehicle-to-everything (V2X) communications. Sidelink communications (e.g., V2X communication) may include sensor data sharing between user equipments (UEs). For instance, V2X UEs may share sensor data including indications of crashes, obstructions, traffic patterns, or the like. V2X UEs may improve user safety, enable a user to avoid or mitigate various travel conditions, provide data to users, or the like, based on shared sensor data. However, sidelink UEs may be limited to operations on the specific frequencies, channels, frequency bands, or carriers, according to specific capabilities, or may be otherwise limited by use of one or more parameters. For instance, some UEs may be constrained to operations on frequency range 1 (FR1) while other UEs may be constrained to operations on frequency range 2 (FR2). In some examples, two UEs may not be able to communicate directly with each other due to obstacles (e.g., structures, natural barriers, reflective surfaces, or the like), due to different modulation and coding schemes (MCS), or the like. Such UEs may therefore be unable to share sensor or other sidelink data directly with each other. This may result in failed sidelink communications between UEs, failure to identify and avoid or mitigate traffic patterns or hazards, impacted safety conditions, decreased user experience, or the like.

Techniques described herein may support sidelink communications between UEs (e.g., that are otherwise incompatible or unavailable for direct communication with each other) by forwarding sidelink data by network entities. For example, a first UE and a second UE may not be able to communicate directly with each other (e.g., may operate on different frequencies, according to different parameters, or the like). Network entities (e.g., base stations or disaggregated components of base stations, roadside units (RSUs), remote radio heads (RRHs), network controlled nodes, or other network entities) may support sidelink communications (e.g., may establish PC5 links) with various UEs. Such network entities may monitor for sidelink communications (e.g., via FR1), and may forward relevant sidelink data to other network entities for transmission to other UEs (e.g., via FR2). A first network entity may establish a sidelink connection with a first UE that is unable to communicate directly with a second UE. The network entities may detect sidelink communications including sidelink data from the first UE (e.g., via a first band or channel, according to a first capability, or the like), and may forward the detected sidelink data to a second network entity. The first network entity may forward the sidelink data to the second network entity via a PC5 interface or a backhaul link (e.g., an X2 interface, an Xn interface, or the like) between the two network entities. The second network entity may then transmit the sidelink data to the second UE via a sidelink connection between the second network entity and the second UE. Thus, the network entities may enable sidelink communications between UEs that are not able to communicate directly with each other, by utilizing sidelink connections with respective UEs.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to information sharing between sidelink devices.

Figure 1:
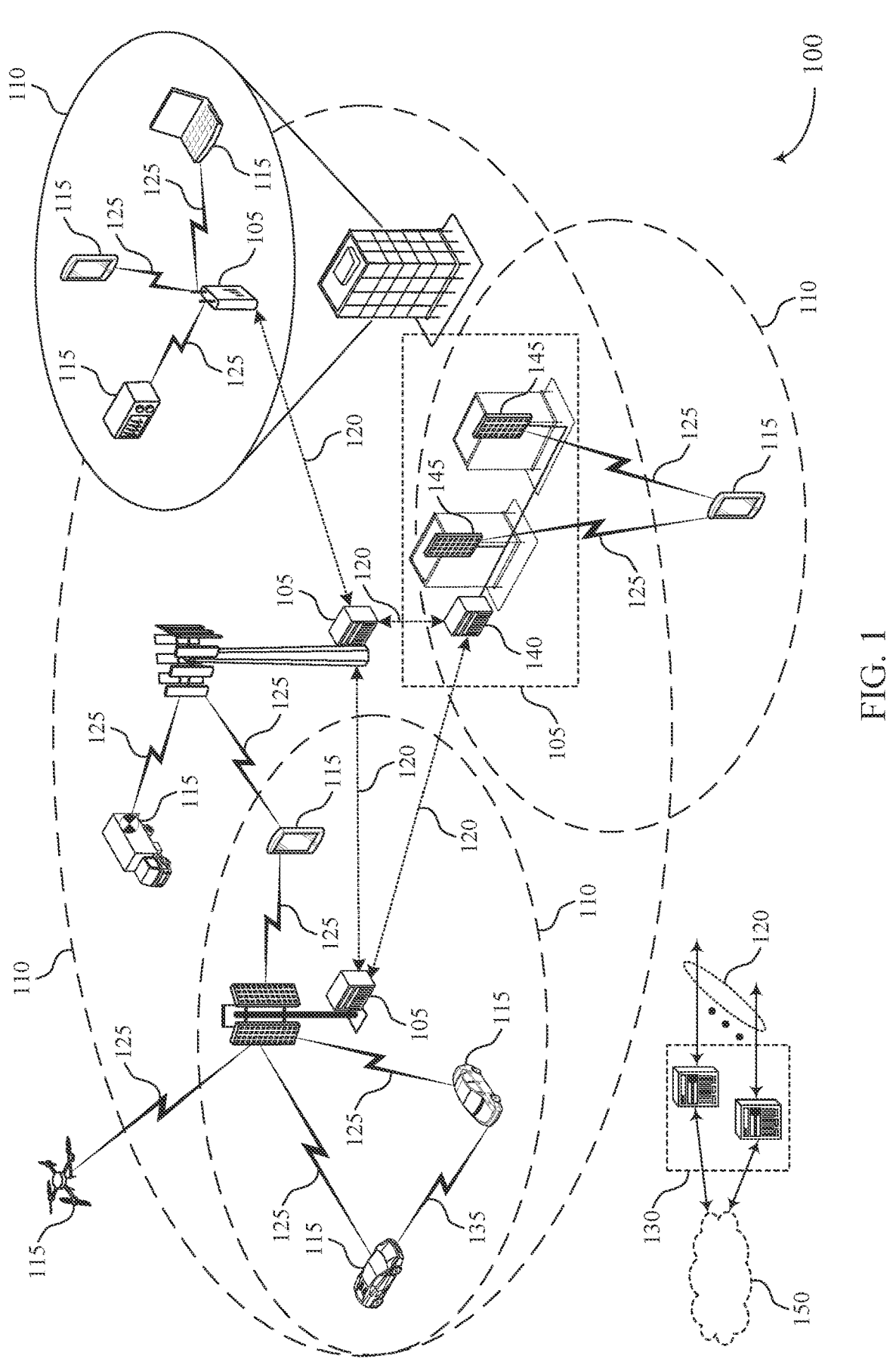
FIG. 1 illustrates an example of a wireless communications system that supports information sharing between sidelink devices in accordance with aspects of the present disclosure.

FIG. 1 illustrates an example of a wireless communications system 100 that supports information sharing between sidelink devices in accordance with aspects of the present disclosure. The wireless communications system 100 may include one or more network entities 105 (e.g., base stations), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 (e.g., base stations) may be dispersed throughout a geographic area to form the wireless communications system 100 and may be devices in different forms or having different capabilities. The network entities 105 (e.g., base stations) and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105 (e.g., base stations), or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105 (e.g., a base station), entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105 (e.g., a base station), a second apparatus, a second device, or a second computing system.

The network entities 105 (e.g., base stations) may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 (e.g., base stations) described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 (e.g., base stations) and the network equipment including macro eNBs or gNBs, small cell eNBs or gNBs, or relay base stations, among other examples, as shown in FIG. 1.

The UEs 115 and the network entities 105 (e.g., base stations) may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 (e.g., base stations) or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station) may be movable and therefore provide communication coverage for a moving geographic coverage area 110. In some examples, different geographic coverage areas 110 associated with different technologies may overlap, but the different geographic coverage areas 110 may be supported by the same network entity 105 (e.g., a base station). In other examples, the overlapping geographic coverage areas 110 associated with different technologies may be supported by different network entities 105 (e.g., base stations). The wireless communications system 100 may include, for example, a heterogeneous network in which different types of the network entities 105 (e.g., base stations) provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105 (e.g., a base station), may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 (e.g., a base station) may be distributed across various network devices (e.g., radio heads and ANCs) or consolidated into a single network device (e.g., a network entity 105 (e.g., a base station)).

As described herein, a base station may include one or more components that are located at a single physical location or one or more components located at various physical locations, and any one or more of such components may be referred to herein as a network entity. In examples in which the base station includes components that are located at various physical locations, the various components may each perform various functions such that, collectively, the various components achieve functionality that is similar to a base station that is located at a single physical location. As such, a base station or network entity described herein may equivalently refer to a standalone base station (also known as a monolithic base station) or a base station including network entity components that are located at various physical locations or virtualized locations (also known as a disaggregated base station). In some implementations, such a base station including network entity components that are located at various physical locations may be referred to as or may be associated with a disaggregated radio access network (RAN) architecture, such as an Open RAN (O-RAN) or Virtualized RAN (VRAN) architecture. In some implementations, such network entity components of a base station may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 (e.g., base stations) and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station) or a UE 115 may be equipped with multiple antennas, which may be used to employ techniques such as transmit diversity, receive diversity, multiple-input multiple-output (MIMO) communications, or beamforming. The antennas of a network entity 105 (e.g., a base station) or a UE 115 may be located within one or more antenna arrays or antenna panels, which may support MIMO operations or transmit or receive beamforming. For example, one or more network entity (e.g., base station) antennas or antenna arrays may be co-located at an antenna assembly, such as an antenna tower. In some examples, antennas or antenna arrays associated with a network entity 105 (e.g., a base station) may be located in diverse geographic locations. A network entity 105 (e.g., a base station) may have an antenna array with a number of rows and columns of antenna ports that the network entity 105 (e.g., a base station) may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105 (e.g., a base station), a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 (e.g., a base station) or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 (e.g., a base station) or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 (e.g., a base station) or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105 (e.g., a base station). Other UEs 115 in such a group may be outside the geographic coverage area 110 of a network entity 105 (e.g., a base station) or be otherwise unable to receive transmissions from a network entity 105 (e.g., a base station). In some examples, groups of the UEs 115 communicating via D2D communications may utilize a one-to-many (1:M) system in which each UE 115 transmits to every other UE 115 in the group. In some examples, a network entity 105 (e.g., a base station) facilitates the scheduling of resources for D2D communications. In other cases, D2D communications are carried out between the UEs 115 without the involvement of a network entity 105 (e.g., a base station).

In some systems, the D2D communication link 135 may be an example of a communication channel, such as a sidelink communication channel, between vehicles (e.g., UEs 115). For example, the D2D communication link 135 may be an example of a sidelink interface (e.g., a PC5/V2X interface). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSU, or with the network via one or more network entities (e.g., network entities 105 (e.g., base stations)) using vehicle-to-network (V2N) communications, or with both.

In some examples, the UEs 115 may support sidelink or V2X communications with each other over a PC5/V2X interface. For example, the D2D communication link 135 may represent a PC5/Vx interface for performing sidelink or V2X communications. In some examples, the communication link 125 may represent a Uu link, where the UEs 115 may communicate with the network entities 105 (e.g., base stations) over the Uu link. In some examples (e.g., NR systems or LTE systems), sidelink or V2X communications between UEs 115 may occur over a PC5 or V2X interface. UEs 115 may also be connected to network entities (e.g., base stations. RSUs or other network entities) via different radio access technologies (RATs). In some examples, sidelink or V2X communications between UEs 115 may be supported if the UEs 115 operate on a same frequency band, according to a same set of capabilities or parameters, or the like. However, in some examples, UEs 115 may not be compatible with each other (e.g., may operate using different frequency bands or according to different sets of capabilities or parameters).

In some examples, an operator (e.g., mobile phone carrier) may configure the UE with different properties (e.g., a mobile carrier may configure the UE with a specified operating frequency, frequency band, channel configuration, capability, etc. over a Uu link).

The UEs 115, network entities 105 (e.g., base stations, RSUs, RRHs, network controlled nodes, etc.), and other wireless devices of the wireless communications system 100 may support techniques which enable sidelink communications between UEs 115 by forwarding sidelink data by one or more network entities (e.g., network entities 105). In particular, the wireless devices of the wireless communications system 100 may enable sidelink communications between the UEs 115 and the one or more network entities 105 (e.g., base stations, RSUs, or other network entities) which may enable forwarding of sidelink data from one UE 115 to another UE 115 via the one or more network entities.

For example, a first UE 115 and a second UE 115 may not be compatible with each other (e.g., one may operate on FR1 while the other may operate on FR2) and network entities (e.g., network entities 105 (e.g., base stations), RSUs, or other network entities) may support sidelink communications (e.g., PC5 links) with various UEs 115 as described herein. The network entities may monitor for sidelink communications (e.g., via FR1), and may forward relevant sidelink data to other network entities for transmission to other UEs 115 (e.g., via FR2). In some examples, a first network entity 105 may establish a sidelink connection via a sidelink interface similar to the D2D communication links 135 with a first UE 115. The network entity 105 may detect sidelink communications including sidelink data from the first UE 115 (e.g., via a first frequency, frequency band, channel, according to a first capability, or the like), and may forward the detected sidelink data to a second network entity 105. The first network entity 105 may forward the sidelink data to the second network entity either via a PC5 interface (e.g., via a link similar to D2D communication links 135) or backhaul link 120 (e.g., an X2 interface, an Xn interface, or an S1 interface) between the two network entities 105. The second network entity 105 may then transmit the sidelink data to the second UE 115 via a sidelink connection between the second network entity and the second UE 115.

Techniques described herein may facilitate sidelink communications between UEs 115 that are unavailable for direct communication and otherwise unable to directly communicate sidelink data with each other. In particular, enabling sidelink communications between such UEs 115 may allow UEs 115 to identify and avoid or mitigate hazards, increase safety conditions (e.g., in a road environment between vehicles), increase user experience, or may result in other benefits.

FIG. 2 illustrates an example of a wireless communications system 200 that supports information sharing between sidelink devices in accordance with aspects of the present disclosure. In some examples, the wireless communications system 200 may implement, or be implemented by, aspects of the wireless communications system 100. The wireless communications system 200 may include a first network entity 105-a, second network entity 105-b, a first UE 115-a, and a second UE 115-b, which may be examples of the network entities 105 (e.g., base stations) and the UEs 115 described with reference to FIG. 1. The network entity 105-a and the network entity 105-b may similarly be examples of other network entities, such as a remote radio head (RRH), an RSU, a repeater, a network-controlled network node, or any other network entity. In some examples, the network entities 105 may represent two or more base stations associated with a radio access network (RAN). The network entities 105 may serve one or more UEs 115 located within respective coverage areas. For example, the network entities 105 may serve one or more UEs 115 via Uu interfaces. UEs 115 may communicate with each other via sidelink connections 205 (e.g., via a PC5 interface). Some UEs 115 may be located within a coverage area of a network entity 105. Other UEs 115 may be located outside of the coverage are of the network entities 105, and may communicate with other UEs 115 using sidelink communications. The network entities 105 may be located in a small cell, a large cell, a single coverage area, overlapping coverage areas, non-overlapping coverage areas, or any combination thereof.

The UEs 115 may exchange sidelink data (e.g., V2X data, sensor data, etc.) with each other. For example, the UE 115-a and the UE 115-b may transmit sidelink messages to each other over a sidelink connection 205. These V2X or sidelink messages may include sensor data, including indications of crashes, obstructions, traffic patterns, device or vehicle status, location information, or the like. In some examples, sidelink communications including shared sensor data may increase safety and avoid or mitigate various travel conditions, provide data to users, support safety protocols, or the like.

The UE 115-a and the UE 115-b may be unavailable for direct communication with each other (e.g., UEs 115 may not be able to perform direct sidelink communications with each other using sidelink connection 205-a, thereby limiting sensor data sharing). In some cases, UEs 115 may operate on different frequency ranges, or different frequency bands within a same frequency range. For example, the UE 115-*a* may operate on a first frequency range or frequency band (e.g., FR1) while the UE 115-*b* may operate on a second frequency range or frequency band (e.g., FR2). Additionally, or alternatively, the UEs 115 may operate on different carrier frequencies within a frequency band. In some cases, UEs 115 may be incompatible due to a capability mismatch. For example, the UE 115-*a* may be configured with a first MCS table and the UE 115-*b* may be configured with a second MCS table. A UE 115 may not support decoding of a sidelink control information (SCI) message (e.g., an SCI format 2-A and 2B), or may not support decoding of physical sidelink shared channel (PSSCH) associated with an SC message (e.g., SCI format 1-A), if the SCI message indicates an MCS table that the UE 115 does not support. In some examples, the UEs 115 may be unavailable for direct communication with each other due to interfering structures. For example, an in-coverage receiving UE 115 may be shadowed from a transmitting UE 115. This may occur, for example, if the UEs 115 on an interchange are located on either side of a structure (e.g., a tall building) or other obstacles.

In some examples, the wireless communications system 200 may support establishment of sidelink communications between the network entities 105 and the UEs 115, which may support forwarding of sidelink communications between the UEs 115 that are otherwise unable to communicate with each other via sidelink connection 205-*a*. For example, the wireless communications system 200 may enable the network entity 105-*a* and the network entity 105-*b* to operate as sidelink (e.g., V2X) nodes. In such examples, as described herein, the network entity 105-*a* (e.g., a base station, an RRH, an RSU, or the like) may receive sidelink data (e.g., act as a receiving node) from the UE 115-*a* (e.g., a sidelink or V2X UE) operating in one band or frequency range, and then forward the sidelink data (e.g., via a second network entity 105-*b* acting as a transmitting node) to another UE 115-*b* operating in another band or frequency range.

For example, the UE 115-*a* and the UE 115-*b* may operate on different frequency ranges or different frequency bands. The UE 115-*a* may operate on FR1 and the UE 115-*b* may operate on FR2 (e.g., as configured by different operators, or the like). The network entity 105-*a* may be able to communicate on FR1, or both FR1 and FR2. The network entity 105-*b* may be able to communicate on FR1 or FR1 and FR2. The network entity 105-*a* may establish sidelink connection 205-*b* with the UE 115-*a*, and may monitor (e.g., sniff) the sidelink connection 205-*b* for sidelink communications on FR1 (e.g., which the UE 115-*b* may not be able to receive, even if the UE 115-*b* is located within the coverage area of the UE 115-*a*). The network entity 105-*a* may forward received sidelink data to the network entity 105-*b*, and the network entity 105-*b* may forward the sidelink data to the UE 115-*b* via the sidelink connection 205-*d* on FR2. Similar techniques may be applied to different sets of frequency resources such as different frequency channels, different frequency bands, etc.

In some examples, a base station may be the only common link between the UE 115-*a* and the UE 115-*b*. A single base station may communicate with both the UE 115-*a* and the UE 115-*b* (e.g., the network entity 105-*a* and the network entity 105-*b* may be collocated at a same base station). For example, the base station may operate in a first frequency range mode (e.g., FR1) and may receive sidelink data transmitted by the UE 115-*a*, and may transmit the received sidelink data to the UE 115-*b* in a second frequency range mode (e.g., FR2). In such examples, the collocated network entity 105-*a* and network entity 105-*b* may communicate with each other via a shared processor (e.g., the network entity 105-*a* may send the sidelink data received form the UE 115-*a* on the FR1 to the network entity 105-*b* via the shared processor of the base station, and the network entity 105-*b* may transmit the sidelink data to the UE 115-*b* on FR2). In some examples, communicating sidelink data via network entities 105 collocated at the same base station may reduce forwarding overhead associated with forwarding operations described herein. The base station (e.g., at which the network entity 105-*a* and the network entity 105-*b* are collocated) may serve UEs 115 in FR1 or band 1, and may serve UEs 115 in FR2 or band 2, and may relay and share sensor and other sidelink data of the UE 115-*a* and the UE 115-*b*. That is, the base station may act as a sidelink node in both FR1 and FR2, and may not execute an additional step of forwarding received sidelink data to a different base station over a backhaul connection or a sidelink connection.

In some examples, the UE 115-*b* may be unavailable for direct wireless communications from the UE 115-*a* due to a capability mismatch. For instance, the UE 115-*a* may be configured with a first MCS table and the UE 115-*b* may be configured with a second MCS table. In such examples, one or more base stations (e.g., network entity 105-*a* and network entity 105-*b*) may support multiple MCS tables including the first and second MCS tables. Thus, the network entity 105-*a* and the network entity 105-*b* may be able to coordinate to forward sidelink communications according to any of the supported MCS tables.

In some examples, the UE 115-*b* may be unavailable for direct wireless communications from the UE 115-*a* due to obstructions or shadowing (e.g., the UE 115-*b* or the UE 115-*a* or both may be shadowed by a tall building, or other obstruction). In such examples, the network entities 105 may be able to receive and transmit (e.g., forward) sidelink data from the UE 115-*a* to the UE 115-*b*, despite the obstructions or other causes of temporary incompatibility between the UEs 115.

The wireless communication system 200 may support sidelink communication links between network entities 105 and UEs 115 to enable forwarding of sidelink data as described herein. The network entities 105 may establish sidelink connections 205 with multiple UEs 115, other network entities 105, or a combination thereof, within their respective coverage areas. Network entities 105 may therefore perform sidelink operations (e.g., as defined in one or more standards documents). The UE 115-*a* and the UE 115-*b* may not be able to perform sidelink communications with each other. Techniques may be described with reference to FIG. 2 regarding direct communication unavailability resulting from different frequency resources (e.g., the UE 115-*a* may operate on a first set of frequency resources (e.g., FR1 or band 1) and the UE 115-*b* may operate on a second set of frequency resources (e.g., FR2 or band-2)). However, similar techniques may be applied regardless of the reason the UE 115-*b* is unavailable for sidelink communications from the UE 115-*a* (e.g., resulting from a capability mismatch, physical obstructions, interference, or the like). For instance, where the UE 115-*a* and the UE 115-*b* operate using different frequency resources, if the UE 115-*a* transmits sidelink data to the UE 115-*b* via the sidelink connection 205-*a*, the UE 115-*b* may not be able to receive the sidelink data.

The network entity 105-*a* may establish sidelink connection 205-*b* with the UE 115-*a*, and the network entity 105-*b* may establish sidelink connection 205-d with the UE 115-b. The UE 115-a may transmit sidelink data for the UE 115-b (e.g., may attempt to transmit a sidelink message on the sidelink connection 205-a). However, because the UE 115-b is unavailable for sidelink communications with the UE 115-a, the UE 115-b may not receive the sidelink data. The network entity 105-a may monitor the sidelink connection 205-a (e.g., using the first set of frequency resources). Based on the monitoring, the network entity 105-a may receive the sidelink data from the UE 115-a via the sidelink connection 205-b on the first set of frequency resources.

The network entity 105-a may forward the sidelink data received from the UE 115-a to the network entity 105-b. For example, the network entity 105-a many establish a sidelink connection (e.g., a PC5 interface) with the network entity 105-b. The scheduling of sidelink communications (e.g., between the UE 115-a and the network entity 105-a, between the network entity 105-a and the network entity 105-b, etc.) may be performed according to a grant transmitted on a physical sidelink control channel (PSCCH), followed by data transmissions on a physical sidelink shared channel (PSSCH). The receiving device may transmit feedback on a physical sidelink feedback channel (PSFCH) if configured between two immediate sidelink nodes. For instance, the network entity 105-a may transmit a grant on a PSCCH on the sidelink connection 205-c, and may transmit the sidelink data (e.g., transmitted by the UE 115-a using the first set of frequency resources) to the network entity 105-b according to the grant. If configured between the network entity 105-a and the network entity 105-b, the network entity 105-b may transmit a feedback message (e.g., an acknowledgement (ACK) message or a negative acknowledgment (NACK) message) to the network entity 105-a on a PSFCH. Similar protocols may be followed by the network entity 105-a and the UE 115-a on the sidelink connection 205-b, between the network entity 105-b and the UE 115-b on the sidelink connection 205-d, etc.

In examples where the network entity 105-a provides the sidelink data received form the UE 115-a to the network entity 105-b via the sidelink connection 205-c, the network entity may also transmit frequency resource information to the network entity 105-b. For example, to avoid source identifier conflicts for the sidelink data (e.g., originally received by the network entity 105-a from the UE 115-a), the network entity 105-a may transmit, to the network entity 105-b, an indication of a frequency range (e.g., FR1), a frequency band (e.g., band-1), or the like. The frequency resource information may indicate the band on which the network entity 105-a received the sidelink data. The network entity 105-a may include the frequency resource information in a media access control (MAC) control element (CE) (e.g., carried over a PSSCH), or in an additional field from reserved bits in a PSCCH (e.g., SCI format 2-A), or in SCI format 2-B over a PSSCH. The network entity 105-a may include the frequency resource information in a grant (e.g., SCI) or sidelink data message (e.g., on a PSSCH) that includes the sidelink data received from the UE 115-a, or in a separate control or data message. In some examples, the network entity 105-a may transmit a dedicated sidelink radio resource control (RRC) configuration message that includes the frequency resource information. Upon receiving the sidelink data (e.g., via the sidelink connection 205-c), the network entity 105-b may transmit the sidelink data (e.g., may forward the sidelink message) to the UE 115-b. The network entity 105-b may transmit the sidelink data to the UE 115-b via the second set of frequency resources (e.g., on FR2, on band 2, etc.). Thus, the UE 115-b may receive the sidelink data transmitted by the UE 115-a, despite being unavailable for sidelink communications directly with the UE 115-a.

The network entity 105-a may forward the sidelink data received from the UE 115-a to the network entity 105-b via a point-to-point logical interface (e.g., backhaul connection 210) between network entities 105. The backhaul connection 210 may be an Xn interface, an X2 interface, an S1 interface, an NG interface, or the like (e.g., a logical interface between the network entity 105-a and the network entity 105-b). In such examples, the network entity 105-a may receive, from the UE 115-a, a sidelink message including the sidelink data using the sidelink connection 205-b. The network entity 105-a may decode the received sidelink message, and may generate one or more packet data units (PDUs), including the decoded sidelink data, for transmission to the network entity 105-b using the backhaul connection 210. The network entity 105-a may include, in the PDU, a source identifier, a destination identifier, and the forwarded sidelink data. If the network entity 105-a includes the forwarded sidelink data in the one or more PDUs, then the network entity 105-a may further include, in the one or more PDUs, frequency resource information (e.g., an indication of a band, a frequency identifier (e.g., a frequency location)), physical location information for the UE 115-a, a source UE identifier for the UE 115-a, or any combination thereof. In some examples, the network entity 105-a may include, in the one or more PDUs, an indication that the one or more PDUs include sidelink data (e.g., for forwarding to the UE 115-b). The network entity 105-a may include, in the one or more PDUs, a header to identify data from each physical layer channel (e.g., physical sidelink broadcast channel (PSBCH), PSSSCH, and PSFCH). The header may not include an indication of PSCCH, because the PSSCH payload may be directly shared. The payload of the one or more PDUs may include one or more of the following: for the PSBCH, a master information block (MIB) (e.g., as decoded), for the PSSCH, sidelink data (e.g., as decoded), and for the PSFCH, one-bit ACK or NACK information (e.g., in the case of multi-cast signaling).

In examples where the network entity 105-a provides the sidelink data received from the UE 115-a to the network entity 105-b via the backhaul connection 210, the network entity 105-a and the network entity 105-b may operate as sidelink nodes. In such examples, the network entity 105-a may decode the sidelink data received from the UE 115-a over the sidelink connection 205-b, but may signal the same sidelink data to the network entity 105-b over a more robust logical interface (e.g., the backhaul connection 210). The network entity 105-b may receive and decode the one or more PDUs, including the sidelink data. The network entity 105-b may use the received sidelink data to encode or create a sidelink message (e.g., a PSBCH, a PSCCH and PSSCH, a PSFCH, or any combination thereof), and may transmit the generated sidelink message to the UE 115-b via the sidelink connection 205-d. The network entity 105-b may transmit the sidelink message using the second set of frequency resources (e.g., FR2 or band 2), so that the UE 115-b may receive and decode the sidelink message. Using the backhaul connection 210 (e.g., instead of a sidelink connection 205-c) to forward sidelink data between network entities 105 may reduce latency and radio resource overhead.

The network entity 105-a may select a connection on which to forward sidelink data received from the UE 115-a. In some examples, the network entity 105-a may not be configured with a backhaul connection 210 (e.g., a logical interface). In such examples, the network entity 105-a may establish the sidelink connection 205-*c* with the network entity 105-*b*, and may forward the sidelink data via the sidelink connection 205-*c*. In some examples, the network entity may use the backhaul connection 210 for forwarding sidelink data (e.g., instead of the sidelink connection 205-*c*), if the backhaul connection 210 is established (e.g., may determine to use the backhaul connection 210, instead of the sidelink connection 205-*c*). The network entities may be able to communicate with each other either via the backhaul connection 210, or via the sidelink connection 205-*c* (e.g., if both connections are available, the network entities 105 may select one of the two available connections). In some examples, if both connections are available, the network entity may select one of the two connections that is a default connection (e.g., the backhaul connection 210 or the sidelink connection 205-*c* may be designated as a default connection by one or more rules, or one or more standards documents).

In some examples, the network entity 105-*a* may provide an indication of location of the UE 115-*a* to the UE 115-*b* (e.g., via the network entity 105-*b*). For example, the network entity 105-*a* may transmit a message (e.g., via the sidelink connection 205-*c* or the backhaul connection 210) including the sidelink data to the network entity 105-*b*. The network entity 105-*a* may also include, in the message, an indication of the location of the UE 115-*a*. The network entity 105-*b* may forward the indication (e.g., along with the sidelink data) to the UE 115-*b*. In such examples, the UE 115-*b* may make localized judgments to further decode the sidelink data or neglect the sidelink data (e.g., if the location is not in the immediate proximity of the UE 115-*b* or there are no adverse effects if the information is not decoded). For example, the UE 115-*b* may determine that the location of the UE 115-*a* is within a threshold distance, or is within a coverage area of the UE 115-*b*. In such examples, the UE 115-*b* may decode the sidelink data received from the network entity 105-*b*. If the UE 115-*b* determines that the location of the UE 115-*a* is not within the threshold distance, or is not within the coverage area of the UE 115-*b*, then the UE 115-*b* may ignore (e.g., refrain from decoding) the forwarded sidelink data. For instance, if the UE 115-*a* is far away from the UE 115-*b* (e.g., is on a different street, is far enough away from the UE 115-*b* on a highway, or the like), then the sidelink data may not be relevant to the UE 115-*b* (e.g., a detected obstacle, or other sidelink data detected by the UE 115-*a*, may not impact the UE 115-*b*). If the sidelink data is not relevant to the UE 115-*b*, then the UE 115-*b* may conserve power and computational resources by ignoring the forwarded sidelink data. Such mechanisms may ensure that any sidelink data that is potentially relevant is forwarded to the UE 115-*b* (e.g., via the network entities 105), but may also provide the UE 115-*b* with the opportunity to efficiently expend power and computational resources by decoding relevant sidelink data (e.g., not all forwarded sidelink data regardless of relevance).

The UEs 115 may or may not also maintain a wireless communication link with base stations (e.g., network entities 105) via a Uu interface. The techniques described herein (e.g., forwarding sidelink data by network entities 105) may rely on sidelink connections 205 (e.g., regardless of whether the UEs 115 are connected to the network entities 105 via Uu interfaces). In some examples, one or more UEs 115 may receive broadcast of sidelink or V2X common information in case of non-preconfigured sidelink or V2X communications. The UEs 115 may utilize the broadcast sidelink or V2X common information to establish or communicate via sidelink connections 205. UEs 115 that communicate over LTE V2X and 5G sidelink (e.g., V2X) may utilize techniques described herein to share information via base station forwarding (e.g., forwarding of sidelink data by network entities 105). For example, the UE 115-*a* may transmit sidelink data to one or more UEs 115 via sidelink connections 205 with other UEs 115. Additionally, the UE 115-*a* may forward sidelink data to one or more UEs 115 (e.g., the UE 115-*b*) via the network entities 105, as described herein.

In some examples, one or more network entities 105 may support communication of alerts. For example, a network entity 105 (e.g., which is enabled to support sidelink connections 205 with sidelink UEs 115) may support direct delivery of alert messages from the network (e.g., base stations) to sidelink UEs 115. The network may be the source of alert messages (e.g., commercial mobile alert system (CMAS), earthquake and tsunami warning system (ETWS), or the like), and may directly relay alert messages to sidelink UEs 115 in a timely manner (e.g., via the sidelink connections 205, resulting in improved safety procedures, decreased latency, and improved user experience). In some examples, network entities 105 may be configured to automatically forward any detected sidelink monitoring, and receiving network entities 105 may determine whether to forward sidelink data to connected UEs 115, or may automatically forward received sidelink data to all connected UEs 115 (e.g., and receiving UEs 115 may determine whether forwarded sidelink data is relevant based on frequency resource information, location information, device identifiers, or the like).

FIG. 3 illustrates an example of a process flow 300 that supports information sharing between sidelink devices in accordance with aspects of the present disclosure. In some examples, the process flow 300 may implement, or be implemented by, aspects of wireless communications system 100 or wireless communications system 200. In particular, the process flow 300 illustrates configurations and signaling which enable a network entity 105-*c* and a network entity 105-*d* to forward sidelink data from a UE 115-*c* to a UE 115-*d*, as described with reference to FIGS. 1-2, among other aspects.

The process flow 300 may include a first UE 115-*c*, a second UE 115-*d*, a first network entity 105-*c*, and a second network entity 105-*d*, which may be examples of UEs 115 and network entities 105 as described with reference to FIGS. 1 and 2. For example, the UE 115-*c* and the UE 115-*d* illustrated in FIG. 3 may include examples of the first UE 115-*a* and the second UE 115-*b*, respectively, as described with reference to FIG. 2. Similarly, the first network entity 105-*c* and the second network entity 105-*d* illustrated in FIG. 3 may include examples of the first network entity 105-*a* and the second network entity 105-*b*, respectively, as described with reference to FIG. 2. The UEs 115 may be examples of V2X devices. The network entities 105 may be examples of any of a base station, RRH, RSU, or the like. In some examples, the first network entity 105-*c* and the second network entity 105-*d* may be collocated and associated with a same processing unit.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305-*a*, 305-*b*, and 305-*c*, sidelink connections or other connections may be established between the UEs 115 and the network entities 105. For example, at 305-*a*, the first network entity 105-*c* may establish a first sidelink connection with the first UE 115-*c* (e.g., a PC5 link). Similarly, at 305-*b*, the first network entity 105-*c* may establish a second sidelink connection or a backhaul connection with the second network entity 105-*d* (e.g., a PC5 link, or an X2/Xn or S1 link, respectively). At 305-*c*, the second network entity 105-*d* may establish a sidelink connection with the second UE 115-*d*. The established sidelink connections may be examples of sidelink connections 205 described with reference to FIG. 2. The established backhaul connection may similarly be an example of the backhaul connection 210 described with reference to FIG. 2.

At 310, the first UE 115-*c* may transmit, and the first network entity 105-*c* may receive, a first sidelink message via the first sidelink connection. In some examples, the first sidelink message may include sidelink data for second UE 115-*d*. In some aspects, the second UE 115-*d* may be unavailable for direct communication with the first UE 115-*c*, and so may be unable to receive sidelink messages directly from the first UE 115-*c*. The first network entity 105-*c* may thus monitor the first sidelink connection, and upon detecting the first sidelink message, may forward the first sidelink message from the first UE 115-*c* to the second UE 115-*d* via the second sidelink connection or via the backhaul connection with the second network entity 105-*d*. In some examples, the first sidelink message may represent a failed sidelink communication between the first UE 115-*c* and the second UE 115-*d* (e.g., the first UE 115-*c* may transmit the first sidelink message to the second UE 115-*d*, but the transmission may fail due to the UEs 115 operating on different frequency resources, capability mismatch, shadowing, or the like).

In some examples, as described herein, the first network entity 105-*c* may receive the first message (e.g., sidelink data) transmitted by the first UE 115-*c* on a first set of frequency resources that is supported by the first UE 115-*c* but not by the second UE 115-*d* (e.g., a first frequency range or frequency band (e.g., FR1)). In some examples, the first set of frequency resources may be different from a second set of frequency resources that is not supported by the first UE 115-*c* (e.g., a second frequency range or frequency band (e.g., FR2)), but that is supported by the second UE 115-*d*. In some examples the UE 115-*c* and the UE 115-*d* may be unable to communicate directly due to supporting or operating on different sets of frequency resources.

In some examples, the first network entity 105-*c* may receive the sidelink message transmitted by the first UE 115-*c* according to a first MCS that is supported by the first UE 115-*c* but is not supported by the second UE 115-*d* (e.g., the first UE 115-*c* may be configured with a first MCS table and the second UE 115-*d* may be configured with a second MCS table). In some examples, the UE 115-*c* and the UE 115-*d* may be unable to communicate directly due to supporting or operating according to different MCSs. However, the first network entity 105-*c*, the second network entity 105-*d*, or both, may support multiple MCSs, including both the first and second MCS In some examples, the first UE 115-*c* and the second UE 115-*d* may be unable to communicate directly with each other due to shadowing, obstructions, or interference. For example, the first UE 115-*c* and the second UE 115-*d* may be located such that an obstruction, such as a building, is located in between the UEs 115, resulting in an inability to communicate directly with each other.

In some examples, where the first network entity 105-*c* establishes a second sidelink connection with the second network entity 105-*d* at 305-*b*, the first network entity 105-*c* may transmit the sidelink data received at 310 to the second network entity 105-*d* via the second sidelink connection. For example, at 320, the first network entity 105-*c* may generate a message. The first network entity 105-*c* may generate a second sidelink message including the sidelink data from the first sidelink message (e.g., the first network entity 105-*c* may generate a new sidelink message including the received sidelink data, or may prepare the received first sidelink message for forwarding to the second network entity 105-*d* without decoding the first sidelink message). At 325, the first network entity 105-*c* may transmit, and the second network entity 105-*d* may receive, the second message (e.g., the generated sidelink message) via the sidelink connection. The first network entity 105-*c* may transmit, to the second network entity 105-*d*, a frequency resource identifier associated with the sidelink resources on which the first network entity received the sidelink data (e.g., an indication of FR1), location information associated with the first UE, or both. The first network entity 105-*c* may include such information in a MAC-CE, an SCI, a sidelink RRC message, or any combination thereof. In some examples, the first network entity 105-*c* may include the frequency information or location information in the second message transmitted at 325, or may transmit the frequency information or location information or both in a separate message. In such examples, upon receiving the second sidelink message at 325 via the sidelink connection, the second network entity 105-*d* may generate a third sidelink message at 335 (e.g., the second network entity 105-*d* may generate a sidelink message including the sidelink data received at 325, or may prepare the received sidelink message for forwarding to the second UE 115-*d* without decoding the received sidelink message).

At 340, the second network entity may then transmit the third sidelink message to the second UE 115-*d* via the sidelink connection established at 305-*c*. In some examples, the second network entity 105-*d* may transmit the sidelink message on a set of frequency resources (e.g., FR2) on which the second UE 115-*d* operates, but on which the first UE 115-*c* does not operate (e.g., the first UE 115-*c* may operate on FR1 and the second UE 115-*d* may operate on FR2). In some examples, the second network entity 105-*d* may transmit the third message according to an MCS supported by the second UE 115-*d* that is not supported by the first UE 115-*c* (e.g., the first UE 115-*c* support a first MCS table, and the second UE 115-*d* supports a second MCS table, and the second network entity 105-*d* transmits the third message according to the second MCS table). In some examples, the first network entity 105-*d* may include, in the third message, an indication of the first set of frequency resources on which the first network entity 105-*c* received the first message at 310. For instance, the first network entity 105-*c* nay include, in the second message transmitted at 325, frequency information, location information, etc. In such examples, the second network entity 105-*d* may include frequency information, location information, or the like, in the third message transmitted at 340. For instance, the third message (e.g., or other signaling between the second network entity 105-*d* and the second UE 115-*d*) may include an indication of FR1 (e.g., on which the first UE 115-*c* transmitted the first message), an indication of the location of the UE 115-*c*, or the like.

In some examples, where the first network entity 105-*c* establishes a backhaul connection with the second network entity 105-*d* at 305-*b*, the first network entity 105-*c* may transmit the sidelink data received at 310 to the second network entity 105-*d* via the backhaul connection at 325. For example, at 315, the first network entity 105-*c* may decode the first sidelink message including the sidelink data. The first network entity 105-*c* may then encode the received sidelink data for communication with the second network entity 105-*d* via another type of connection (e.g., for sending over the backhaul link to the second network entity 105-*d*).

At 320, the first network entity 105-*c* may generate a PDU including the sidelink data from the first sidelink message after decoding the first sidelink message at 315. In some examples, the PDU may include a source identifier associated with the first network entity 105-*c*, a destination identifier associated with the second network entity 105-*d*, or both. In some examples, the PDU may include an indication that the PDU includes sidelink data (e.g., an indication that the PDU includes the sidelink data from the first sidelink message, an indication that the PDU includes some sidelink data, or the like). Additionally, or alternatively, the PDU may include a frequency resource identifier associated with the sidelink resources on which the first network entity 105-*c* received the first sidelink message from the first UE 115-*c*. The PDU may also include location information associated with the first UE 115-*c* or an identifier associated with the first UE 115-*c*. In some examples, the PDU may include an indication that the PDU is associated with the sidelink data from the first UE 115-*c* for the second UE 115-*d*. In some examples, the PDU may include any combination of identifiers, indications, and information described herein.

In such examples, at 330, the second network entity 105-*d* may decode the PDU. At 335, the second network entity 105-*d* may generate a sidelink message including the sidelink data received at 325. The Second network entity 105-*d* may then transmit the sidelink message (e.g., a third message) including the sidelink data to the second UE 115-*d*. In some examples, the second network entity 105-*d* may transmit the sidelink message on a set of frequency resources (e.g., FR2) on which the second UE 115-*d* operates, but on which the first UE 115-*c* does not operate (e.g., the first UE 115-*c* may operate on FR1, and the second UE 115-*d* may operate on FR2). In some examples, the second network entity 105-*d* may transmit the third message according to an MCS supported by the second UE 115-*d* that is not supported by the first UE 115-*c* (e.g., the first UE 115-*c* support a first MCS table, and the second UE 115-*d* supports a second MCS table, and the second network entity 105-*d* transmits the third message according to the second MCS table).

In some examples, the second network entity 105-*d* may indicate the first set of frequency resources supported by the first UE 115-*c* (e.g., FR1) to the second UE 115-*d*. For example, the third sidelink message may include the indication of the first set of frequency resources (e.g., indicating FR1 supported by the first UE 115-*c*). In some examples, the second network entity 105-*d* may transmit a frequency resource identifier based on the frequency resource identifier received at the second network entity 105-*d*.

In some examples, the second network entity 105-*d* may transmit location information associated with the UE 115-*c* to the second UE 115-*d* (e.g., GPS, GNSS, or another type of information related to location and positioning of the first UE 115-*c*). In some examples, the second network entity 105-*d* may transmit both the frequency resource identifier and the location information to the second UE 115-*d*.

At 345, the second UE 115-*d* may determine message relevance for the third message received at 340. For example, the second UE 115-*d* may make localized judgments to further decode the sidelink data or neglect (e.g., ignore) the sidelink data (e.g., if the location is not in the immediate proximity of the UE 115-*b* or there are no adverse effects if the information is not decoded). For instance, the third message transmitted at 340 may include location information for the UE 115-*c*. If the location of the UE 115-*c* renders sidelink data from the first UE 115-*c* irrelevant to the second UE 115-*d* (e.g., if the first UE 115-*c* is located at or above a threshold distance away from the second UE 115-*d*), then the second UE 115-*d* may refrain from decoding the third message (e.g. may discard the message, resulting in more efficient power expenditures, prolonged battery life, more efficient use of available computation resources and system resources, etc.).

In some examples, the second UE 115-*d* may use the indicated first set of frequency resources (e.g., supported frequency range, carrier, channel, or band information) to avoid source ID conflicts. For example, the first UE 115-*c* and the second UE 115-*d* may both have the same source ID. The identical source ID may also be included in the signaling for forwarding the sidelink data, which may result in conflicting signaling, or incorrect interpretation and decoding of the forwarded sidelink signal. However, the second UE 115-*d* may determine that the indicated first set of frequency resources is different from the second set of frequency resources supported by the second UE 115-*d*, and thus determine that the sidelink data originated from another UE 115 that is different from the second UE 115-*d* (e.g., despite the source ID). The second UE 115-*d* may similarly use other data indicated in addition to the sidelink data to determine that the sidelink data originates from another UE (e.g., supported MCS tables, supported channels, an identifier associated with the first UE 115-*c*, etc.).

FIG. 4 shows a block diagram 400 of a device 405 that supports information sharing between sidelink devices in accordance with aspects of the present disclosure. The device 405 may be an example of aspects of a network entity as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to information sharing between sidelink devices). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to information sharing between sidelink devices). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of information sharing between sidelink devices as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first network entity in accordance with examples as disclosed herein. For example, the communications manager 420 may be configured as or otherwise support a means for establishing a first sidelink connection with a first UE. The communications manager 420 may be configured as or otherwise support a means for receiving, at the first network entity via the first sidelink connection, a first sidelink message including sidelink data from the first UE for a second UE that is unavailable for direct communication with the first UE. The communications manager 420 may be configured as or otherwise support a means for forwarding the sidelink data to a second UE via a second sidelink connection or a backhaul connection with a second network entity.

Additionally, or alternatively, the communications manager 420 may support wireless communications in accordance with examples as disclosed herein. For example, the communications manager 420 may be configured as or otherwise support a means for receiving, from a first network entity by a second network entity via a first sidelink connection or a backhaul connection, sidelink data associated with a first UE connected to a first network entity via a second sidelink connection, where the sidelink data is for a second UE that is unavailable for direct communication with the first UE. The communications manager 420 may be configured as or otherwise support a means for establishing a third sidelink connection with the second UE. The communications manager 420 may be configured as or otherwise support a means for transmitting, to the second UE via the third sidelink connection, a first sidelink message including the sidelink data associated with the first UE.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for forwarding of sidelink data between UEs via network entities, resulting in decreased latency, reduced power consumption, more efficient utilization of computation and communication resources, increased safety and comfort of users, providing data to users, avoiding or mitigating various travel conditions and other hazards, or the like.

FIG. 5 shows a block diagram 500 of a device 505 that supports information sharing between sidelink devices in accordance with aspects of the present disclosure. The device 505 may be an example of aspects of a device 405 or a network entity as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to information sharing between sidelink devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to information sharing between sidelink devices). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of information sharing between sidelink devices as described herein. For example, the communications manager 520 may include a sidelink connection manager 525, a sidelink communication manager 530, a communication forwarding manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first network entity in accordance with examples as disclosed herein. The sidelink connection manager 525 may be configured as or otherwise support a means for establishing a first sidelink connection with a first UE. The sidelink communication manager 530 may be configured as or otherwise support a means for receiving, at the first network entity via the first sidelink connection, a first sidelink message including sidelink data from the first UE for a second UE that is unavailable for direct communication with the first UE. The communication forwarding manager 535 may be configured as or otherwise support a means for forwarding the sidelink data to a second UE via a second sidelink connection or a backhaul connection with a second network entity.

Additionally, or alternatively, the communications manager 520 may support wireless communications in accordance with examples as disclosed herein. The sidelink communication manager 530 may be configured as or otherwise support a means for receiving, from a first network entity by a second network entity via a first sidelink connection or a backhaul connection, sidelink data associated with a first UE connected to a first network entity via a second sidelink connection, where the sidelink data is for a second UE that is unavailable for direct communication with the first UE. The sidelink connection manager 525 may be configured as or otherwise support a means for establishing a third sidelink connection with the second UE. The communication forwarding manager 535 may be configured as or otherwise support a means for transmitting, to the second UE via the third sidelink connection, a first sidelink message including the sidelink data associated with the first UE.

FIG. 6 shows a block diagram 600 of a communications manager 620 that supports information sharing between sidelink devices in accordance with aspects of the present disclosure. The communications manager 620 may be an example of aspects of a communications manager 420, a communications manager 520, or both, as described herein. The communications manager 620, or various components thereof, may be an example of means for performing various aspects of information sharing between sidelink devices as described herein. For example, the communications manager 620 may include a sidelink connection manager 625, a sidelink communication manager 630, a communication forwarding manager 635, a message generation manager 640, a backhaul connection manager 645, a frequency resource manager 650, an MCS manager 655, a message decoding manager 660, or any combination thereof. Each of these components may communicate, directly or indirectly, with one another (e.g., via one or more buses).

The communications manager 620 may support wireless communications at a first network entity in accordance with examples as disclosed herein. The sidelink connection manager 625 may be configured as or otherwise support a means for establishing a first sidelink connection with a first UE. The sidelink communication manager 630 may be configured as or otherwise support a means for receiving, at the first network entity via the first sidelink connection, a first sidelink message including sidelink data from the first UE for a second UE that is unavailable for direct communication with the first UE. The communication forwarding manager 635 may be configured as or otherwise support a means for forwarding the sidelink data to a second UE via a second sidelink connection or a backhaul connection with a second network entity.

In some examples, to support forwarding the sidelink data to the second UE, the sidelink connection manager 625 may be configured as or otherwise support a means for establishing the second sidelink connection with the second network entity. In some examples, to support forwarding the sidelink data to the second UE, the message generation manager 640 may be configured as or otherwise support a means for generating a second sidelink message including the sidelink data. In some examples, to support forwarding the sidelink data to the second UE, the communication forwarding manager 635 may be configured as or otherwise support a means for transmitting the second sidelink message to the second network entity via the second sidelink connection.

In some examples, the communication forwarding manager 635 may be configured as or otherwise support a means for transmitting, to the second network entity, a frequency resource identifier associated with sidelink resources on which the first network entity received the sidelink data, location information associated with the first UE, or both.

In some examples, the communication forwarding manager 635 may be configured as or otherwise support a means for including the frequency resource identifier in a MAC-CE, a sidelink control information message, a sidelink radio resource control message, or any combination thereof.

In some examples, to support forwarding the sidelink data to the second UE, the backhaul connection manager 645 may be configured as or otherwise support a means for decoding the first sidelink message including the sidelink data. In some examples, to support forwarding the sidelink data to the second UE, the message generation manager 640 may be configured as or otherwise support a means for generating a packet data unit including sidelink data from the first sidelink message. In some examples, to support forwarding the sidelink data to the second UE, the communication forwarding manager 635 may be configured as or otherwise support a means for transmitting the packet data unit to the second network entity via the backhaul connection.

In some examples, the packet data unit includes a source identifier associated with the first network entity, a destination identifier associated with the second network entity, an indication that the packet data unit includes the sidelink data, a frequency resource identifier associated with sidelink resources on which the first network entity received the sidelink data from the first UE, location information associated with the first UE, an identifier associated with the first UE, an indication that the packet data unit is associated with the sidelink data from the first UE for the second UE, or any combination thereof.

In some examples, to support receiving the first sidelink message from the first UE for the second UE that is unavailable for direct communication with the first UE, the frequency resource manager 650 may be configured as or otherwise support a means for receiving the first sidelink message on a first set of one or more frequency resources, where the first UE does not support sidelink communication on a second set of one or more frequency resources that is different from the first set of one or more frequency resources.

In some examples, to support forwarding the sidelink data to the second UE that is unavailable for direct communication with the first UE, the communication forwarding manager 635 may be configured as or otherwise support a means for transmitting the sidelink data and an indication of the first set of one or more frequency resources to the second network entity for forwarding to the second UE on the second set of one or more frequency resources, where the second UE does not support sidelink communication on the first set of one or more frequency resources.

In some examples, to support receiving the first sidelink message from the first UE for the second UE that is unavailable for direct communication with the first UE, the MCS manager 655 may be configured as or otherwise support a means for receiving the first sidelink message according to a first modulation and coding scheme that is supported by the first UE but is not supported by the second UE. In some examples, to support forwarding the sidelink data to the second UE that is unavailable for direct communication with the first UE, the communication forwarding manager 635 may be configured as or otherwise support a means for transmitting the sidelink data to the second network entity for forwarding to the second UE according to a second modulation and coding scheme that is supported by the second UE.

In some examples, the first network entity and the second network entity include base stations, remote radio heads, roadside units, or a combination thereof. In some examples, the first network entity and the second network entity are collocated and associated with a processing unit. In some examples, the first UE and the second UE include vehicle-to-everything devices.

Additionally, or alternatively, the communications manager 620 may support wireless communications in accordance with examples as disclosed herein. In some examples, the sidelink communication manager 630 may be configured as or otherwise support a means for receiving, from a first network entity by a second network entity via a first sidelink connection or a backhaul connection, sidelink data associated with a first UE connected to a first network entity via a second sidelink connection, where the sidelink data is for a second UE that is unavailable for direct communication with the first UE. In some examples, the sidelink connection manager 625 may be configured as or otherwise support a means for establishing a third sidelink connection with the second UE. In some examples, the communication forwarding manager 635 may be configured as or otherwise support a means for transmitting, to the second UE via the third sidelink connection, a first sidelink message including the sidelink data associated with the first UE.

In some examples, to support receiving the sidelink data, the sidelink connection manager 625 may be configured as or otherwise support a means for establishing the first sidelink connection with the first network entity. In some examples, to support receiving the sidelink data, the sidelink communication manager 630 may be configured as or otherwise support a means for receiving a second sidelink message including the sidelink data via the first sidelink connection.

In some examples, the sidelink communication manager 630 may be configured as or otherwise support a means for receiving, from the first network entity, a frequency resource identifier associated with sidelink resources on which the first network entity received the sidelink data, location information associated with the first UE, or both. In some examples, the frequency resource identifier is included in a MAC-CE, a sidelink control information message, or a sidelink radio resource control message, or a combination thereof.

In some examples, to support receiving the sidelink data, the sidelink communication manager 630 may be configured as or otherwise support a means for receiving a packet data unit including the sidelink data from the first network entity via the backhaul connection. In some examples, to support receiving the sidelink data, the message decoding manager 660 may be configured as or otherwise support a means for decoding the sidelink data from the packet data unit.

In some examples, the packet data unit includes a source identifier associated with the first network entity, a destination identifier associated with the second network entity, an indication that the packet data unit includes the sidelink data, a frequency resource identifier associated with sidelink resources on which the first network entity received the sidelink data from the first UE, location information associated with the first UE, an identifier associated with the first UE, an indication that the packet data unit is associated with the sidelink data from the first UE for the second UE, or any combination thereof.

In some examples, to support transmitting the first sidelink message to the second UE that is unavailable for direct communication with the first UE, the frequency resource manager 650 may be configured as or otherwise support a means for transmitting, on a first set of one or more frequency resources, the first sidelink message including an indication of a second set of one or more frequency resources that is different from the first set of one or more frequency resources, where the second UE does not support sidelink communications on the second set of one or more frequency resources and the first UE does not support sidelink communication on the first set of one or more frequency resources.

In some examples, to support transmitting the first sidelink message to the second UE that is unavailable for direct communication with the first UE, the MCS manager 655 may be configured as or otherwise support a means for transmitting the first sidelink message according to a first modulation and coding scheme that is supported by the second UE but is not supported by the first UE.

In some examples, the first network entity and the second network entity include base stations, remote radio heads, roadside units, or a combination thereof. In some examples, the first network entity and the second network entity are collocated and associated with a processing unit. In some examples, the first UE and the second UE include vehicle-to-everything devices.

FIG. 7 shows a diagram of a system 700 including a device 705 that supports information sharing between sidelink devices in accordance with aspects of the present disclosure. The device 705 may be an example of or include the components of a device 405, a device 505, or a network entity as described herein. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting information sharing between sidelink devices). For example, the device 705 or a component of the device 705 may include a processor 740 and memory 730 coupled to the processor 740, the processor 740 and memory 730 configured to perform various functions described herein.

The inter-station communications manager 745 may manage communications with other network entities 105 (e.g., base stations), and may include a controller or scheduler for controlling communications with UEs 115 in cooperation with other network entities 105 (e.g., base stations). For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between network entities 105 (e.g., base stations).

The communications manager 720 may support wireless communications at a first network entity in accordance with examples as disclosed herein. For example, the communications manager 720 may be configured as or otherwise support a means for establishing a first sidelink connection with a first UE. The communications manager 720 may be configured as or otherwise support a means for receiving, at the first network entity via the first sidelink connection, a first sidelink message including sidelink data from the first UE for a second UE that is unavailable for direct communication with the first UE. The communications manager 720 may be configured as or otherwise support a means for forwarding the sidelink data to a second UE via a second sidelink connection or a backhaul connection with a second network entity.

Additionally, or alternatively, the communications manager 720 may support wireless communications in accordance with examples as disclosed herein. For example, the communications manager 720 may be configured as or otherwise support a means for receiving, from a first network entity by a second network entity via a first sidelink connection or a backhaul connection, sidelink data associated with a first UE connected to a first network entity via a second sidelink connection, where the sidelink data is for a second UE that is unavailable for direct communication with the first UE. The communications manager 720 may be configured as or otherwise support a means for establishing a third sidelink connection with the second UE. The communications manager 720 may be configured as or otherwise support a means for transmitting, to the second UE via the third sidelink connection, a first sidelink message including the sidelink data associated with the first UE.

By including or configuring the communications manager 720 in accordance with examples as described herein, the device 705 may support techniques for forwarding of sidelink data between UEs via network entities, resulting in decreased latency, reduced power consumption, more efficient utilization of computation and communication resources, improved communication reliability, improved coordination between devices, improved user experience related to more reliable communications, or the like.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of information sharing between sidelink devices as described herein, or the processor 740 and the memory 730 may be otherwise configured to perform or support such operations.

FIG. 8 shows a flowchart illustrating a method 800 that supports information sharing between sidelink devices in accordance with aspects of the present disclosure. The operations of the method 800 may be implemented by a network entity or its components as described herein. For example, the operations of the method 800 may be performed by a network entity 105 as described with reference to FIGS. 1 through 7. In some examples, a network entity may execute a set of instructions to control the functional elements of the network entity to perform the described functions. Additionally. or alternatively, the network entity may perform aspects of the described functions using special-purpose hardware.

At 805, the method may include establishing a first sidelink connection with a first UE. The operations of 805 may be performed in accordance with examples as disclosed herein. In some examples, aspects of the operations of 805 may be performed by a sidelink connection manager 625 as described with reference to FIG. 6.

At 810, the method may include receiving, at a first network entity via the first sidelink connection, a first sidelink message including sidelink data from the first UE for a second UE that is unavailable for direct communication with the first UE. The operations of 810 may be performed in accordance with examples as disclosed herein. In some examples, aspects of the operations of 810 may be performed by a sidelink communication manager 630 as described with reference to FIG. 6.

At 815, the method may include forwarding the sidelink data to the second UE via a second sidelink connection or a backhaul connection with a second network entity. The operations of 815 may be performed in accordance with examples as disclosed herein. In some examples, aspects of the operations of 815 may be performed by a communication forwarding manager 635 as described with reference to FIG. 6.

FIG. 9 shows a flowchart illustrating a method 900 that supports information sharing between sidelink devices in accordance with aspects of the present disclosure. The operations of the method 900 may be implemented by a network entity or its components as described herein. For example, the operations of the method 900 may be performed by a network entity 105 as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 905, the method may include establishing a first sidelink connection with a first UE. The operations of 905 may be performed in accordance with examples as disclosed herein. In some examples, aspects of the operations of 905 may be performed by a sidelink connection manager 625 as described with reference to FIG. 6.

At 910, the method may include receiving, at a first network entity via the first sidelink connection, a first sidelink message including sidelink data from the first UE for a second UE that is unavailable for direct communication with the first UE. The operations of 910 may be performed in accordance with examples as disclosed herein. In some examples, aspects of the operations of 910 may be performed by a sidelink communication manager 630 as described with reference to FIG. 6.

At 915, the method may include establishing a second sidelink connection with a second network entity. The operations of 915 may be performed in accordance with examples as disclosed herein. In some examples, aspects of the operations of 915 may be performed by a sidelink connection manager 625 as described with reference to FIG. 6.

At 920, the method may include generating a second sidelink message including the sidelink data. The operations of 920 may be performed in accordance with examples as disclosed herein. In some examples, aspects of the operations of 920 may be performed by a message generation manager 640 as described with reference to FIG. 6.

At 925, the method may include transmitting the second sidelink message to the second network entity via the second sidelink connection. The operations of 925 may be performed in accordance with examples as disclosed herein. In some examples, aspects of the operations of 925 may be performed by a communication forwarding manager 635 as described with reference to FIG. 6.

FIG. 10 shows a flowchart illustrating a method 1000 that supports information sharing between sidelink devices in accordance with aspects of the present disclosure. The operations of the method 1000 may be implemented by a network entity or its components as described herein. For example, the operations of the method 1000 may be performed by a network entity 105 as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1005, the method may include establishing, by a first network entity, a first sidelink connection with a first UE. The operations of 1005 may be performed in accordance with examples as disclosed herein. In some examples, aspects of the operations of 1005 may be performed by a sidelink connection manager 625 as described with reference to FIG. 6.

At 1010, the method may include receiving, at the first network entity via the first sidelink connection, a first sidelink message including sidelink data from the first UE for a second UE that is unavailable for direct communication with the first UE. The operations of 1010 may be performed in accordance with examples as disclosed herein. In some examples, aspects of the operations of 1010 may be performed by a sidelink communication manager 630 as described with reference to FIG. 6.

At 1015, the method may include decoding the first sidelink message including the sidelink data. The operations of 1015 may be performed in accordance with examples as disclosed herein. In some examples, aspects of the operations of 1015 may be performed by a backhaul connection manager 645 as described with reference to FIG. 6.

At 1020, the method may include generating a packet data unit including sidelink data from the first sidelink message. The operations of 1020 may be performed in accordance with examples as disclosed herein. In some examples, aspects of the operations of 1020 may be performed by a message generation manager 640 as described with reference to FIG. 6.

At 1025, the method may include transmitting the packet data unit to a second network entity via a backhaul connection. The operations of 1025 may be performed in accordance with examples as disclosed herein. In some examples, aspects of the operations of 1025 may be performed by a communication forwarding manager 635 as described with reference to FIG. 6.

FIG. 11 shows a flowchart illustrating a method 1100 that supports information sharing between sidelink devices in accordance with aspects of the present disclosure. The operations of the method 1100 may be implemented by a network entity or its components as described herein. For example, the operations of the method 1100 may be performed by a network entity 105 as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1105, the method may include receiving, from a first network entity by a second network entity via a first sidelink connection or a backhaul connection, sidelink data associated with a first UE connected to the first network entity via a second sidelink connection, where the sidelink data is for a second UE that is unavailable for direct communication with the first UE. The operations of 1105 may be performed in accordance with examples as disclosed herein. In some examples, aspects of the operations of 1105 may be performed by a sidelink communication manager 630 as described with reference to FIG. 6.

At 1110, the method may include establishing a third sidelink connection with the second UE. The operations of 1110 may be performed in accordance with examples as disclosed herein. In some examples, aspects of the operations of 1110 may be performed by a sidelink connection manager 625 as described with reference to FIG. 6.

At 1115, the method may include transmitting, to the second UE via the third sidelink connection, a first sidelink message including the sidelink data associated with the first UE. The operations of 1115 may be performed in accordance with examples as disclosed herein. In some examples, aspects of the operations of 1115 may be performed by a communication forwarding manager 635 as described with reference to FIG. 6.

FIG. 12 shows a flowchart illustrating a method 1200 that supports information sharing between sidelink devices in accordance with aspects of the present disclosure. The operations of the method 1200 may be implemented by a network entity or its components as described herein. For example, the operations of the method 1200 may be performed by a network entity 105 as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1205, the method may include establishing a first sidelink connection with a first network entity by a second network entity. The operations of 1205 may be performed in accordance with examples as disclosed herein. In some examples, aspects of the operations of 1205 may be performed by a sidelink connection manager 625 as described with reference to FIG. 6.

At 1210, the method may include receiving, from the first network entity by the second network entity via the first sidelink connection, a first sidelink message including sidelink data associated with a first UE connected to the first network entity via a second sidelink connection, where the sidelink data is for a second UE that is unavailable for direct communication with the first UE. The operations of 1210 may be performed in accordance with examples as disclosed herein. In some examples, aspects of the operations of 1210 may be performed by a sidelink communication manager 630 as described with reference to FIG. 6.

At 1215, the method may include establishing a third sidelink connection with the second UE. The operations of 1215 may be performed in accordance with examples as disclosed herein. In some examples, aspects of the operations of 1215 may be performed by a sidelink connection manager 625 as described with reference to FIG. 6.

At 1220, the method may include transmitting, to the second UE via the third sidelink connection, a second sidelink message including the sidelink data associated with the first UE. The operations of 1220 may be performed in accordance with examples as disclosed herein. In some examples, aspects of the operations of 1220 may be performed by a communication forwarding manager 635 as described with reference to FIG. 6.

FIG. 13 shows a flowchart illustrating a method 1300 that supports information sharing between sidelink devices in accordance with aspects of the present disclosure. The operations of the method 1300 may be implemented by a network entity or its components as described herein. For example, the operations of the method 1300 may be performed by a network entity 105 as described with reference to FIGS. 1 through 7. In some examples, a network entity may execute a set of instructions to control the functional elements of the network entity to perform the described functions. Additionally. or alternatively, the network entity may perform aspects of the described functions using special-purpose hardware.

At 1305, the method may include receiving, from a first network entity by a second network entity via a backhaul connection, a packet data unit including sidelink data associated with a first UE connected to the first network entity via a first sidelink connection, where the sidelink data is for a second UE that is unavailable for direct communication with the first UE. The operations of 1305 may be performed in accordance with examples as disclosed herein. In some examples, aspects of the operations of 1305 may be performed by a sidelink communication manager 630 as described with reference to FIG. 6.

At 1310, the method may include decoding the sidelink data from the packet data unit. The operations of 1310 may be performed in accordance with examples as disclosed herein. In some examples, aspects of the operations of 1310 may be performed by a message decoding manager 660 as described with reference to FIG. 6.

At 1315, the method may include establishing a second sidelink connection with the second UE. The operations of 1315 may be performed in accordance with examples as disclosed herein. In some examples, aspects of the operations of 1315 may be performed by a sidelink connection manager 625 as described with reference to FIG. 6.

At 1320, the method may include transmitting, to the second UE via the second sidelink connection, a first sidelink message including the sidelink data associated with the first UE. The operations of 1320 may be performed in accordance with examples as disclosed herein. In some examples, aspects of the operations of 1320 may be performed by a communication forwarding manager 635 as described with reference to FIG. 6.

The following provides an overview of aspects of the present disclosure:

Aspect 1: A method for wireless communications at a first network entity, comprising: establishing a first sidelink connection with a first UE; receiving, at the first network entity via the first sidelink connection, a first sidelink message comprising sidelink data from the first UE for a second UE that is unavailable for direct communication with the first UE; and forwarding the sidelink data to a second UE via a second sidelink connection or a backhaul connection with a second network entity.

Aspect 2: The method of aspect 1, wherein forwarding the sidelink data to the second UE comprises: establishing the second sidelink connection with the second network entity; generating a second sidelink message comprising the sidelink data; and transmitting the second sidelink message to the second network entity via the second sidelink connection.

Aspect 3: The method of aspect 2, further comprising: transmitting, to the second network entity, a frequency resource identifier associated with sidelink resources on which the first network entity received the sidelink data, location information associated with the first UE, or both.

Aspect 4: The method of aspect 3, further comprising: including the frequency resource identifier in a medium access control control element, a sidelink control information message, a sidelink radio resource control message, or any combination thereof.

Aspect 5: The method of any of aspects 1 through 4, wherein forwarding the sidelink data to the second UE comprises: decoding the first sidelink message comprising the sidelink data; generating a packet data unit comprising sidelink data from the first sidelink message; and transmitting the packet data unit to the second network entity via the backhaul connection.

Aspect 6: The method of aspect 5, wherein the packet data unit comprises a source identifier associated with the first network entity, a destination identifier associated with the second network entity, an indication that the packet data unit comprises the sidelink data, a frequency resource identifier associated with sidelink resources on which the first network entity received the sidelink data from the first UE, location information associated with the first UE, an identifier associated with the first UE, an indication that the packet data unit is associated with the sidelink data from the first UE for the second UE, or any combination thereof.

Aspect 7: The method of any of aspects 1 through 6, wherein receiving the first sidelink message from the first UE for the second UE that is unavailable for direct communication with the first UE comprises: receiving the first sidelink message on a first set of one or more frequency resources, wherein the first UE does not support sidelink communication on a second set of one or more frequency resources that is different from the first set of one or more frequency resources.

Aspect 8: The method of aspect 7, wherein forwarding the sidelink data to the second UE that is unavailable for direct communication with the first UE comprises: transmitting the sidelink data and an indication of the first set of one or more frequency resources to the second network entity for forwarding to the second UE on the second set of one or more frequency resources, wherein the second UE does not support sidelink communication on the first set of one or more frequency resources.

Aspect 9: The method of any of aspects 1 through 8, wherein receiving the first sidelink message from the first UE for the second UE that is unavailable for direct communication with the first UE comprises: receiving the first sidelink message according to a first modulation and coding scheme that is supported by the first UE but is not supported by the second UE.

Aspect 10: The method of aspect 9, wherein forwarding the sidelink data to the second UE that is unavailable for direct communication with the first UE comprises: transmitting the sidelink data to the second network entity for forwarding to the second UE according to a second modulation and coding scheme that is supported by the second UE.

Aspect 11: The method of any of aspects 1 through 10, wherein the first network entity and the second network entity comprise base stations, remote radio heads, roadside units, or a combination thereof.

Aspect 12: The method of any of aspects 1 through 11, wherein the first network entity and the second network entity are collocated and associated with a processing unit.

Aspect 13: The method of any of aspects 1 through 12, wherein the first UE and the second UE comprise vehicle-to-everything devices.

Aspect 14: A method for wireless communications, comprising: receiving, from a first network entity by a second network entity via a first sidelink connection or a backhaul connection, sidelink data associated with a first UE connected to the first network entity via a second sidelink connection, wherein the sidelink data is for a second UE that is unavailable for direct communication with the first UE; establishing a third sidelink connection with the second UE; and transmitting, to the second UE via the third sidelink connection, a first sidelink message comprising the sidelink data associated with the first UE.

Aspect 15: The method of aspect 14, wherein receiving the sidelink data comprises: establishing the first sidelink connection with the first network entity; and receiving a second sidelink message comprising the sidelink data via the first sidelink connection.

Aspect 16: The method of aspect 15, further comprising: receiving, from the first network entity, a frequency resource identifier associated with sidelink resources on which the first network entity received the sidelink data, location information associated with the first UE, or both.

Aspect 17: The method of aspect 16, wherein the frequency resource identifier is included in a medium access control control element, a sidelink control information message, or a sidelink radio resource control message, or a combination thereof.

Aspect 18: The method of any of aspects 14 through 17, wherein receiving the sidelink data comprises: receiving a packet data unit comprising the sidelink data from the first network entity via the backhaul connection; and decoding the sidelink data from the packet data unit.

Aspect 19: The method of aspect 18, wherein the packet data unit comprises a source identifier associated with the first network entity, a destination identifier associated with the second network entity, an indication that the packet data unit comprises the sidelink data, a frequency resource identifier associated with sidelink resources on which the first network entity received the sidelink data from the first UE, location information associated with the first UE, an identifier associated with the first UE, an indication that the packet data unit is associated with the sidelink data from the first UE for the second UE, or any combination thereof.

Aspect 20: The method of any of aspects 14 through 19, wherein transmitting the first sidelink message to the second UE that is unavailable for direct communication with the first UE comprises: transmitting, on a first set of one or more frequency resources, the first sidelink message comprising an indication of a second set of one or more frequency resources that is different from the first set of one or more frequency resources, wherein the second UE does not support sidelink communications on the second set of one or more frequency resources and the first UE does not support sidelink communication on the first set of one or more frequency resources.

Aspect 21: The method of any of aspects 14 through 20, wherein transmitting the first sidelink message to the second UE that is unavailable for direct communication with the first UE comprises: transmitting the first sidelink message according to a first modulation and coding scheme that is supported by the second UE but is not supported by the first UE.

Aspect 22: The method of any of aspects 14 through 21, wherein the first network entity and the second network entity comprise base stations, remote radio heads, roadside units, or a combination thereof.

Aspect 23: The method of any of aspects 14 through 22, wherein the first network entity and the second network entity are collocated and associated with a processing unit.

Aspect 24: The method of any of aspects 14 through 23, wherein the first UE and the second UE comprise vehicle-to-everything devices.

Aspect 25: An apparatus for wireless communications at a first network entity, comprising a processor; memory coupled with the processor; and instructions stored in the memory and executable by the processor to cause the apparatus to perform a method of any of aspects 1 through 13.

Aspect 26: An apparatus for wireless communications at a first network entity, comprising at least one means for performing a method of any of aspects 1 through 13.

Aspect 27: A non-transitory computer-readable medium storing code for wireless communications at a first network entity, the code comprising instructions executable by a processor to perform a method of any of aspects 1 through 13.

Aspect 28: An apparatus for wireless communications, comprising a processor; memory coupled with the processor; and instructions stored in the memory and executable by the processor to cause the apparatus to perform a method of any of aspects 14 through 24.

Aspect 29: An apparatus for wireless communications, comprising at least one means for performing a method of any of aspects 14 through 24.

Aspect 30: A non-transitory computer-readable medium storing code for wireless communications, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first network entity, comprising:
   one or more processors;
   one or more memories coupled with the one or more processors; and
   instructions stored in the one or more memories and executable by the one or more processors to cause the apparatus to:
      establish a first sidelink connection with a first user equipment (UE);
      receive, at the first network entity via the first sidelink connection, a first sidelink message comprising sidelink data from the first UE for a second UE that is unavailable for direct communication with the first UE;
      forward the sidelink data, to the second UE, via a second sidelink connection with a second network entity, wherein the instructions to forward the sidelink data to the second UE are executable by the one or more processors to cause the apparatus to:
         establish the second sidelink connection with the second network entity;
         generate a second sidelink message comprising the sidelink data; and
         transmit the second sidelink message to the second network entity via the second sidelink connection; and
      transmit, to the second network entity, a frequency resource identifier indicating sidelink resources on which the first network entity received the sidelink data.

2. The apparatus of claim 1, wherein the instructions are further executable by the one or more processors to cause the apparatus to:
   transmit, to the second network entity, location information associated with the first UE.

3. The apparatus of claim 1, wherein the instructions are further executable by the one or more processors to cause the apparatus to:
   include the frequency resource identifier in a medium access control control element, a sidelink control information message, a sidelink radio resource control message, or any combination thereof.

4. The apparatus of claim 1, wherein the instructions to forward the sidelink data to the second UE are executable by the one or more processors to cause the apparatus to:
   decode the first sidelink message comprising the sidelink data;
   generate a packet data unit comprising the sidelink data from the first sidelink message; and
   transmit the packet data unit to the second network entity.

5. The apparatus of claim 4, wherein the packet data unit comprises a source identifier associated with the first network entity, a destination identifier associated with the second network entity, an indication that the packet data unit comprises the sidelink data, the frequency resource identifier, location information associated with the first UE, an identifier associated with the first UE, an indication that the packet data unit is associated with the sidelink data from first UE for the second UE, or any combination thereof.

6. The apparatus of claim 1, wherein the instructions to receive the first sidelink message from the first UE for the second UE that is unavailable for direct communication with the first UE are executable by the one or more processors to cause the apparatus to:
   receive the first sidelink message on a first set of one or more frequency resources, wherein the first UE does not support sidelink communication on a second set of one or more frequency resources that is different from the first set of one or more frequency resources.

7. The apparatus of claim 6, wherein the instructions to forward the sidelink data to the second UE that is unavailable for direct communication with the first UE are executable by the one or more processors to cause the apparatus to:
   transmit the sidelink data and an indication of the first set of one or more frequency resources to the second network entity for forwarding to the second UE on the second set of one or more frequency resources, wherein the second UE does not support sidelink communication on the first set of one or more frequency resources.

8. The apparatus of claim 6, wherein the instructions to receive the first sidelink message from the first UE for the second UE that is unavailable for direct communication with the first UE are executable by the one or more processors to cause the apparatus to:
   receive the first sidelink message according to a first modulation and coding scheme that is supported by the first UE but is not supported by the second UE.

9. The apparatus of claim 8, wherein the instructions to forward the sidelink data to the second UE that is unavailable for direct communication with the first UE are executable by the one or more processors to cause the apparatus to:
   transmit the sidelink data to the second network entity for forwarding to the second UE according to a second modulation and coding scheme that is supported by the second UE.

10. The apparatus of claim 1, wherein the first network entity and the second network entity comprise base stations, remote radio heads, roadside units, or a combination thereof.

11. The apparatus of claim 1, wherein the first network entity and the second network entity are collocated and associated with a processing unit.

12. The apparatus of claim 1, wherein:
   the first UE and the second UE comprise vehicle-to-everything devices.

13. An apparatus for wireless communications, comprising:
   one or more processors;

one or more memories coupled with the one or more processors; and instructions stored in the one or more memories and executable by the one or more processors to cause the apparatus to:

establish a first sidelink connection with a first network entity;

receive, from the first network entity by a second network entity, via the first sidelink connection with the first network entity, a first sidelink message comprising sidelink data associated with a first user equipment (UE) connected to the first network entity via a second sidelink connection, wherein the sidelink data is for a second UE that is unavailable for direct communication with the first UE;

receive, from the first network entity, a frequency resource identifier indicating sidelink resources on which the first network entity received the sidelink data;

establish a third sidelink connection with the second UE; and transmit, to the second UE via the third sidelink connection, a second sidelink message comprising the sidelink data associated with the first UE.

14. The apparatus of claim 13, wherein the instructions are further executable by the one or more processors to cause the apparatus to:

receive, from the first network entity, location information associated with the first UE.

15. The apparatus of claim 13, wherein the frequency resource identifier is included in a medium access control control element, a sidelink control information message, or a sidelink radio resource control message, or a combination thereof.

16. The apparatus of claim 13, wherein the instructions to receive the sidelink data are executable by the one or more processors to cause the apparatus to:

receive a packet data unit comprising the sidelink data from the first network entity; and decode the sidelink data from the packet data unit.

17. The apparatus of claim 16, wherein the packet data unit comprises a source identifier associated with the first network entity, a destination identifier associated with the second network entity, an indication that the packet data unit comprises the sidelink data, the frequency resource identifier, location information associated with the first UE, an identifier associated with the first UE, an indication that the packet data unit is associated with the sidelink data from the first UE for the second UE, or any combination thereof.

18. The apparatus of claim 13, wherein the instructions to transmit the second sidelink message to the second UE that is unavailable for direct communication with the first UE are executable by the one or more processors to cause the apparatus to:

transmit, on a first set of one or more frequency resources, the second sidelink message comprising an indication of a second set of one or more frequency resources that is different from the first set of one or more frequency resources, wherein the second UE does not support sidelink communications on the second set of one or more frequency resources and the first UE does not support sidelink communication on the first set of one or more frequency resources.

19. The apparatus of claim 13, wherein the instructions to transmit the second sidelink message to the second UE that is unavailable for direct communication with the first UE are executable by the one or more processors to cause the apparatus to:

transmit the second sidelink message according to a first modulation and coding scheme that is supported by the second UE but is not supported by the first UE.

20. The apparatus of claim 13, wherein the first network entity and the second network entity comprise base stations, remote radio heads, roadside units, or a combination thereof.

21. The apparatus of claim 13, wherein the first network entity and the second network entity are collocated and associated with a processing unit.

22. The apparatus of claim 13, wherein:

the first UE and the second UE comprise vehicle-to-everything devices.

23. A method for wireless communications at a first network entity, comprising:

establishing a first sidelink connection with a first user equipment (UE);

receiving, at the first network entity via the first sidelink connection, a first sidelink message comprising sidelink data from the first UE for a second UE that is unavailable for direct communication with the first UE;

forwarding the sidelink data, to the second UE, via a second sidelink connection with a second network entity, wherein forwarding the sidelink data to the second UE comprises:

establishing the second sidelink connection with the second network entity;

generating a second sidelink message comprising the sidelink data; and transmitting the second sidelink message to the second network entity via the second sidelink connection; and transmitting, to the second network entity, a frequency resource identifier indicating sidelink resources on which the first network entity received the sidelink data.

24. The method of claim 23, wherein forwarding the sidelink data to the second UE comprises:

decoding the first sidelink message comprising the sidelink data;

generating a packet data unit comprising the sidelink data from the first sidelink message; and transmitting the packet data unit to the second network entity.

25. A method for wireless communications, comprising:

establishing a first sidelink connection with a first network entity;

receiving, from the first network entity by a second network entity, via the first sidelink connection with the first network entity, sidelink data associated with a first user equipment (UE) connected to the first network entity via a second sidelink connection, wherein the sidelink data is for a second UE that is unavailable for direct communication with the first UE;

receiving, from the first network entity, a frequency resource identifier indicating sidelink resources on which the first network entity received the sidelink data;

establishing a third sidelink connection with the second UE; and transmitting, to the second UE via the third sidelink connection, a first sidelink message comprising the sidelink data associated with the first UE.

26. The method of claim 25, wherein receiving the sidelink data comprises:

receiving a packet data unit comprising the sidelink data from the first network entity; and decoding the sidelink data from the packet data unit.

* * * * *